(12) United States Patent
Miyashita et al.

(10) Patent No.: US 11,648,728 B2
(45) Date of Patent: May 16, 2023

(54) THREE-DIMENSIONAL SHAPED ARTICLE PRODUCING COMPOSITION, PRODUCTION METHOD FOR THREE-DIMENSIONAL SHAPED ARTICLE, AND THREE-DIMENSIONAL SHAPED ARTICLE PRODUCTION APPARATUS

(71) Applicant: Seiko Epson Corporation, Tokyo (JP)

(72) Inventors: Takeshi Miyashita, Suwa (JP); Eiji Okamoto, Matsumoto (JP); Akihiko Tsunoya, Okaya (JP); Naoko Shima, Shiojiri (JP); Makoto Kato, Shiojiri (JP)

(73) Assignee: SEIKO EPSON CORPORATION

( * ) Notice: Subject to any disclaimer, the term of this patent is extended or adjusted under 35 U.S.C. 154(b) by 710 days.

(21) Appl. No.: 16/489,318

(22) PCT Filed: Jan. 18, 2018

(86) PCT No.: PCT/JP2018/001394
§ 371 (c)(1),
(2) Date: Aug. 27, 2019

(87) PCT Pub. No.: WO2018/159133
PCT Pub. Date: Sep. 7, 2018

(65) Prior Publication Data
US 2020/0062978 A1 Feb. 27, 2020

(30) Foreign Application Priority Data
Feb. 28, 2017 (JP) .............................. JP2017-037764

(51) Int. Cl.
*C09D 11/322* (2014.01)
*B33Y 10/00* (2015.01)
(Continued)

(52) U.S. Cl.
CPC ............ *C09D 11/322* (2013.01); *B22F 10/20* (2021.01); *B29C 64/165* (2017.08); *B33Y 10/00* (2014.12);
(Continued)

(58) Field of Classification Search
CPC ... C09D 11/322; C09D 11/033; C09D 11/037; C09D 11/106; C09D 11/107;
(Continued)

(56) References Cited

U.S. PATENT DOCUMENTS

2009/0068376 A1  3/2009 Philippi et al.
2015/0104346 A1* 4/2015 Nakamura .............. B22F 10/20
75/252
(Continued)

FOREIGN PATENT DOCUMENTS

JP  2003-305777 A  10/2003
JP  2008-184622 A   8/2008
(Continued)

*Primary Examiner* — Michael M. Robinson
(74) *Attorney, Agent, or Firm* — Harness, Dickey & Pierce, P.L.C.

(57) ABSTRACT

A three-dimensional shaped article producing composition is provided and contains a plurality of particles, a solvent for dispersing the particles, and a binder having a function to temporarily bind the particles to one another in a state where the solvent is removed, wherein a volume-based average particle diameter of the particles is 0.1 μm or more and less than 50 μm, and a content ratio of the binder is 1.5 vol % or more and 10 vol % or less.

8 Claims, 6 Drawing Sheets

(51) Int. Cl.
  *B29C 64/165* (2017.01)
  *C09D 11/033* (2014.01)
  *C09D 11/037* (2014.01)
  *C09D 11/106* (2014.01)
  *C09D 11/107* (2014.01)
  *C09D 11/36* (2014.01)
  *B22F 10/20* (2021.01)
  *B33Y 70/10* (2020.01)
  *B29K 29/00* (2006.01)
  *B29K 505/00* (2006.01)
  *B33Y 30/00* (2015.01)

(52) U.S. Cl.
  CPC ............ *B33Y 70/10* (2020.01); *C09D 11/033* (2013.01); *C09D 11/037* (2013.01); *C09D 11/106* (2013.01); *C09D 11/107* (2013.01); *C09D 11/36* (2013.01); *B29K 2029/04* (2013.01); *B29K 2505/00* (2013.01); *B33Y 30/00* (2014.12)

(58) Field of Classification Search
  CPC ....... C09D 11/36; B29C 64/165; B33Y 10/00; B33Y 70/00; B29K 2029/04; B29K 2505/00
  See application file for complete search history.

(56) References Cited

U.S. PATENT DOCUMENTS

| | | | |
|---|---|---|---|
| 2016/0040025 A1* | 2/2016 | Norikane | C04B 35/58 |
| | | | 106/206.1 |
| 2016/0089720 A1 | 3/2016 | Kamakura et al. | |
| 2017/0021558 A1* | 1/2017 | Miyashita | B22F 12/00 |
| 2017/0232684 A1* | 8/2017 | Yoshimura | C08K 3/34 |
| | | | 264/308 |

FOREIGN PATENT DOCUMENTS

| | | |
|---|---|---|
| JP | 2008-540173 A | 11/2008 |
| JP | 2015-096646 A | 5/2015 |
| JP | 2016-065284 A | 4/2016 |
| JP | 2016-179584 A | 10/2016 |
| JP | 2017-025386 A | 2/2017 |
| JP | 2017-031490 A | 2/2017 |
| WO | WO-2006-122645 A1 | 11/2006 |
| WO | 2016-068899 A1 | 5/2016 |

\* cited by examiner

THREE-DIMENSIONAL SHAPED ARTICLE PRODUCING COMPOSITION, PRODUCTION METHOD FOR THREE-DIMENSIONAL SHAPED ARTICLE, AND THREE-DIMENSIONAL SHAPED ARTICLE PRODUCTION APPARATUS

BACKGROUND

Technical Field

The present invention relates to a three-dimensional shaped article producing composition, a production method for a three-dimensional shaped article, and a three-dimensional shaped article production apparatus.

Related Art

Heretofore, production of a three-dimensional shaped article using a composition containing a plurality of particles has been performed. In particular, recently, a stacking method (three-dimensional shaping method), in which model data of a three-dimensional object is divided into a large number of two-dimensional sectional layer data (slice data), and thereafter, while sequentially shaping sectional members (layers) corresponding to the respective two-dimensional sectional layer data, the sectional members are sequentially stacked, whereby a three-dimensional shaped article is formed, has attracted attention.

The stacking method can immediately form a three-dimensional shaped article as long as there is model data of a three-dimensional shaped article to be shaped, and it is not necessary to form a mold or the like prior to shaping, and therefore, it is possible to rapidly form a three-dimensional shaped article at low cost. Further, since the formation is performed by staking layers of thin plate-shaped sectional members one by one, even a complicated object having, for example, an internal structure can be formed as an integrated shaped article without being divided into a plurality of components.

As a production method for a three-dimensional shaped article, there is a method in which a layer is formed using a composition containing particles and a solvent for dispersing the particles, and thereafter the layer is irradiated with a laser beam to join the particles to one another (see, for example, JP-A-2008-184622).

Such a method has a problem that when a laser beam is irradiated, particles or a molten material thereof is scattered to decrease the dimensional accuracy of the three-dimensional shaped article to be finally obtained or to cause an abnormality in shape due to the scattered molten material, and also there has been a concern about an adverse effect of the scattered particles on an apparatus or a human body.

An object is to provide a three-dimensional shaped article producing composition that can effectively prevent undesirable scattering of particles or the like in a production process for a three-dimensional shaped article and that can be used for producing a three-dimensional shaped article having excellent dimensional accuracy, to provide a production method for a three-dimensional shaped article that can effectively prevent undesirable scattering of particles or the like in a production process for a three-dimensional shaped article and that can produce a three-dimensional shaped article having excellent dimensional accuracy, and also to provide a three-dimensional shaped article production apparatus that can effectively prevent undesirable scattering of particles or the like in a production process for a three-dimensional shaped article and that can produce a three-dimensional shaped article having excellent dimensional accuracy.

SUMMARY

Such an object is achieved by the following invention.

A three-dimensional shaped article producing composition of the invention is a three-dimensional shaped article producing composition used for producing a three-dimensional shaped article, and is characterized by containing a plurality of particles, a solvent for dispersing the particles, and a binder having a function to temporarily bind the particles to one another in a state where the solvent is removed. A volume-based average particle diameter of the particles is 0.1 µm or more and less than 50 µm. Also, a content ratio of the binder is 1.5 vol % or more and 10 vol % or less.

According to this, a three-dimensional shaped article producing composition that can effectively prevent undesirable scattering of the particles or the like in a production process for a three-dimensional shaped article and that can be used for producing a three-dimensional shaped article having excellent dimensional accuracy can be provided.

In the three-dimensional shaped article producing composition of the invention, it is preferred that the particles are metal particles constituted by a metal material.

According to this, for example, the texture (high-quality texture and massive texture), mechanical strength, toughness, durability, and the like of the three-dimensional shaped article can be further improved. In addition, the reliability of the three-dimensional shaped article can be further improved while improving the productivity of the three-dimensional shaped article.

In the three-dimensional shaped article producing composition of the invention, it is preferred that the metal particles are constituted by SUS 316L.

According to this, the corrosion resistance and the like of the three-dimensional shaped article can be further improved, and an effect brought about by decreasing the carbon content ratio in the final three-dimensional shaped article is more remarkably exhibited.

In the three-dimensional shaped article producing composition of the invention, it is preferred that a content ratio of the binder is 1.5 vol % or more and 2.1 vol % or less.

According to this, the content ratio of carbon in the three-dimensional shaped article to be finally obtained can be more reliably decreased, and also the dimensional accuracy of the three-dimensional shaped article can be further improved.

In the three-dimensional shaped article producing composition of the invention, it is preferred that the volume-based average particle diameter of the particles is 0.1 µm or more and 10 µm or less.

According to this, the mechanical strength and dimensional accuracy of the three-dimensional shaped article to be produced can be further improved while further improving the productivity of the three-dimensional shaped article.

In the three-dimensional shaped article producing composition of the invention, it is preferred that the binder contains at least one of polyvinyl alcohol and an acrylic resin.

According to this, undesirable scattering of the particles or the like can be more effectively prevented, and the dimensional accuracy of the three-dimensional shaped article can be further improved.

In the three-dimensional shaped article producing composition of the invention, it is preferred that the binder contains polyvinyl alcohol, and the solvent contains a polyhydric alcohol.

According to this, the solubility of the binder in the solvent in the three-dimensional shaped article producing composition can be further improved, and the storage stability, viscosity, ejectability, and the like of the three-dimensional shaped article producing composition can be further improved.

In the three-dimensional shaped article producing composition of the invention, it is preferred that the binder contains an acrylic resin, and the solvent contains an ether.

According to this, the solubility of the binder in the solvent in the three-dimensional shaped article producing composition can be further improved, and the storage stability, viscosity, ejectability, and the like of the three-dimensional shaped article producing composition can be further improved. In addition, the productivity of the three-dimensional shaped article can be further improved.

It is preferred that the three-dimensional shaped article producing composition of the invention contains nanocellulose.

According to this, undesirable deformation of the layer can be prevented while effectively preventing undesirable aggregation of the particles in the three-dimensional shaped article producing composition or an undesirable variation in formulation or the like in the three-dimensional shaped article producing composition or the three-dimensional shaped article, and the dimensional accuracy, reliability, and the like of the three-dimensional shaped article can be further improved.

In the three-dimensional shaped article producing composition of the invention, it is preferred that a content ratio of the nanocellulose is 0.02 vol % or more and 0.42 vol % or less.

According to this, the preservability and ejectability of the three-dimensional shaped article producing composition can be further improved, and also the dimensional accuracy of the three-dimensional shaped article can be further improved. In addition, the nanocellulose can be more reliably prevented from undesirably remaining in the final three-dimensional shaped article.

A production method for a three-dimensional shaped article of the invention is characterized by repeatedly performing a series of steps including a layer forming step of forming a layer using the three-dimensional shaped article producing composition of the invention, a solvent removing step of removing the solvent contained in the layer, and a joining step of joining the particles contained in the layer to one another by irradiating the layer with a laser beam.

According to this, a production method for a three-dimensional shaped article that can effectively prevent undesirable scattering of particles or the like in a production process for a three-dimensional shaped article and that can produce a three-dimensional shaped article having excellent dimensional accuracy can be provided.

In the production method for a three-dimensional shaped article of the invention, it is preferred that the layer forming step includes a first pattern forming step of forming a first pattern and a second pattern forming step of forming a second pattern, and the three-dimensional shaped article producing composition is used in at least one of the first pattern forming step and the second pattern forming step.

According to this, the dimensional accuracy of the three-dimensional shaped article can be further improved. In addition, even a three-dimensional shaped article having a more complicated shape can be favorably produced.

In the production method for a three-dimensional shaped article of the invention, it is preferred that the three-dimensional shaped article producing composition is ejected by a dispenser.

According to this, even a three-dimensional shaped article producing composition having a high viscosity can be favorably supplied (ejected), and dripping or the like of the three-dimensional shaped article producing composition after the three-dimensional shaped article producing composition comes in contact with a target site can be more effectively prevented. As a result, the dimensional accuracy of the three-dimensional shaped article to be finally obtained can be further improved. In addition, by using the three-dimensional shaped article producing composition having a high viscosity, a layer having a relatively large thickness can be easily formed, and the productivity of the three-dimensional shaped article can be further improved.

A three-dimensional shaped article production apparatus of the invention is characterized by including a nozzle ejecting the three-dimensional shaped article producing composition of the invention, and a laser beam irradiation unit that irradiates a layer formed by ejecting the three-dimensional shaped article producing composition from the nozzle with a laser beam, and producing a three-dimensional shaped article by stacking the layer.

According to this, a three-dimensional shaped article production apparatus that can effectively prevent undesirable scattering of the particles or the like in a production process for a three-dimensional shaped article and that can produce a three-dimensional shaped article having excellent dimensional accuracy can be provided.

DETAILED DESCRIPTION

Hereinafter, preferred embodiments will be described in detail with reference to the accompanying drawings.
Production Method for Three-Dimensional Shaped Article First, a production method for a three-dimensional shaped article of the invention will be described.

FIGS. 1 to 10 are vertical sectional views schematically showing steps of a production method for a three-dimensional shaped article of a preferred embodiment of the invention. FIG. is a flowchart showing the production method for a three-dimensional shaped article of a preferred embodiment of the invention.

Figure 1:
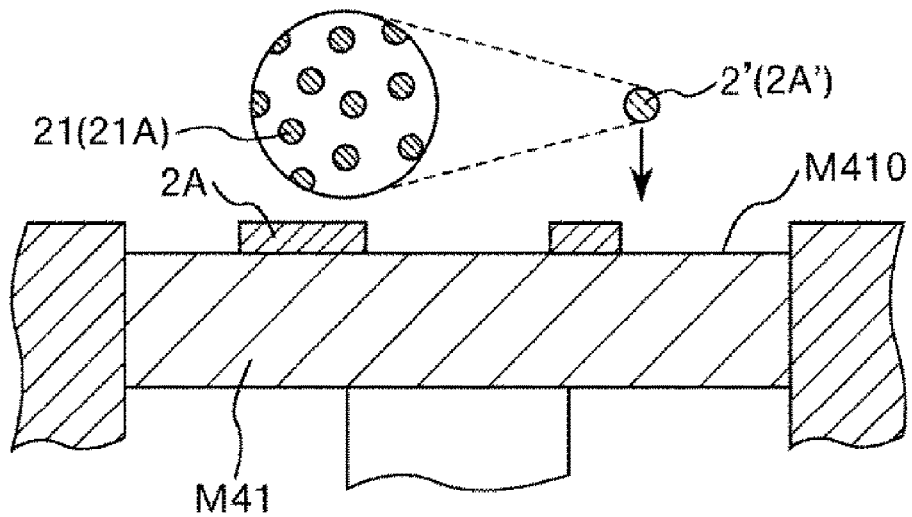
FIG. 1 is a vertical sectional view schematically showing a step (first pattern forming step (layer forming step)) of a production method for a three-dimensional shaped article of a preferred embodiment of the invention.
Figure 2:
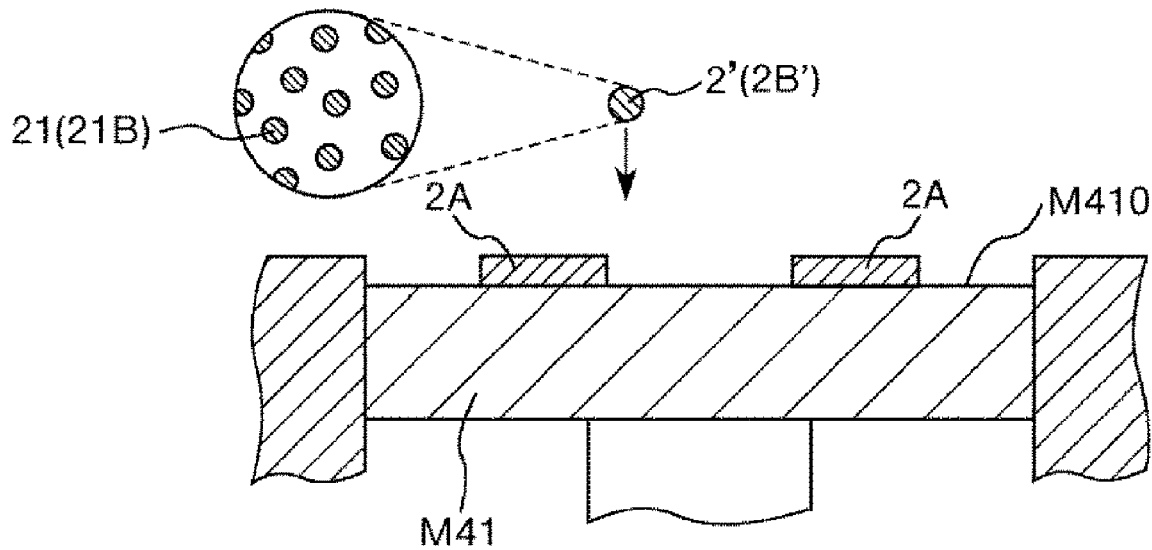
FIG. 2 is a vertical sectional view schematically showing a step (second pattern forming step (layer forming step)) of the production method for a three-dimensional shaped article of the preferred embodiment of the invention.
Figure 3:
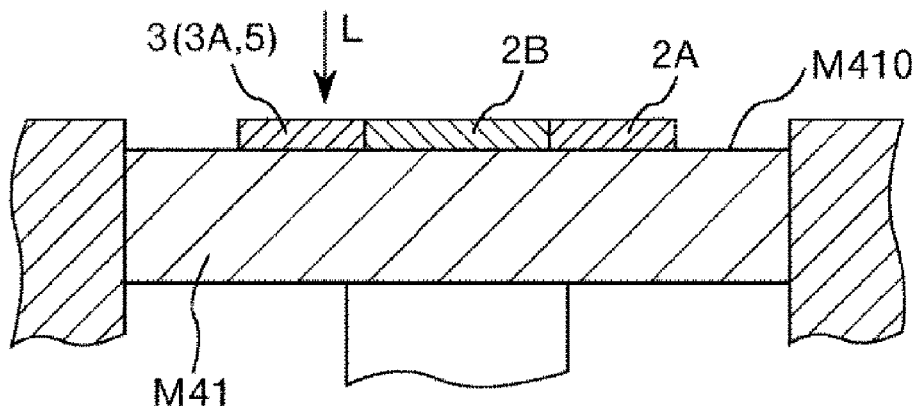
FIG. 3 is a vertical sectional view schematically showing a step (joining step (first joining step)) of the production method for a three-dimensional shaped article of the preferred embodiment of the invention.
Figure 4:
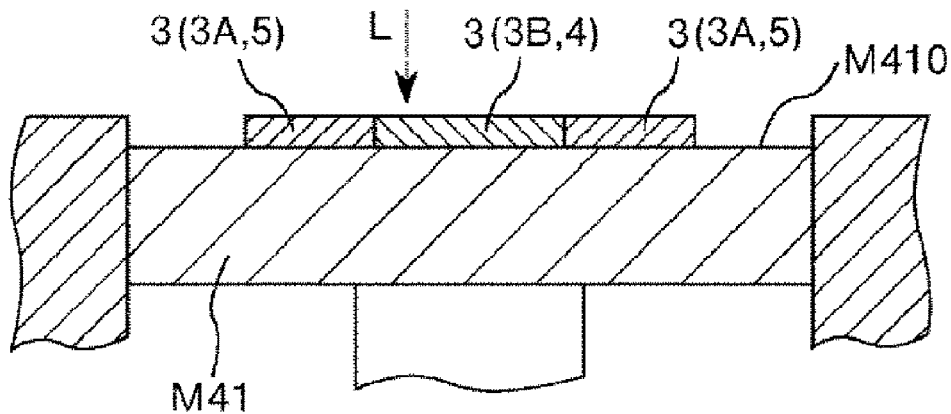
FIG. 4 is a vertical sectional view schematically showing a step (joining step (second joining step)) of the production method for a three-dimensional shaped article of the preferred embodiment of the invention.
Figure 5:
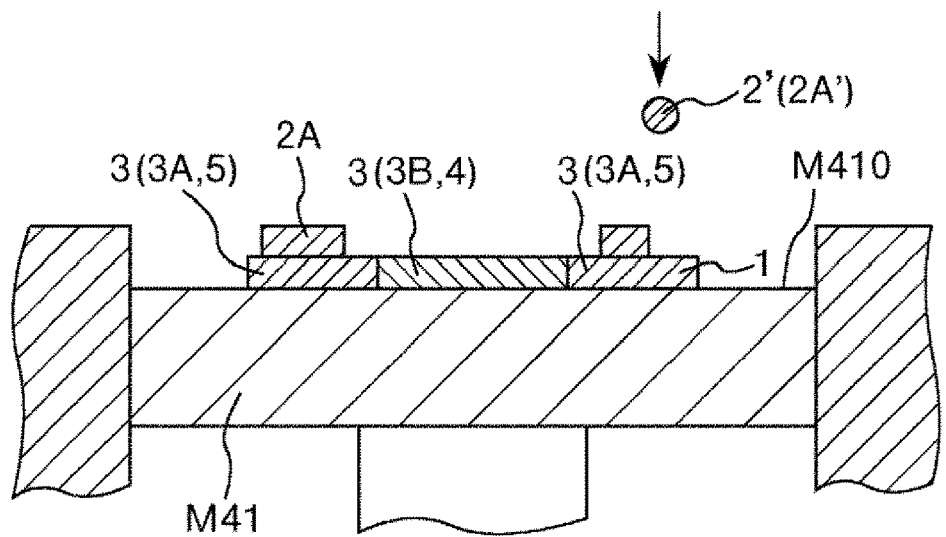
FIG. 5 is a vertical sectional view schematically showing a step (first pattern forming step (layer forming step)) of the production method for a three-dimensional shaped article of the preferred embodiment of the invention.
Figure 6:
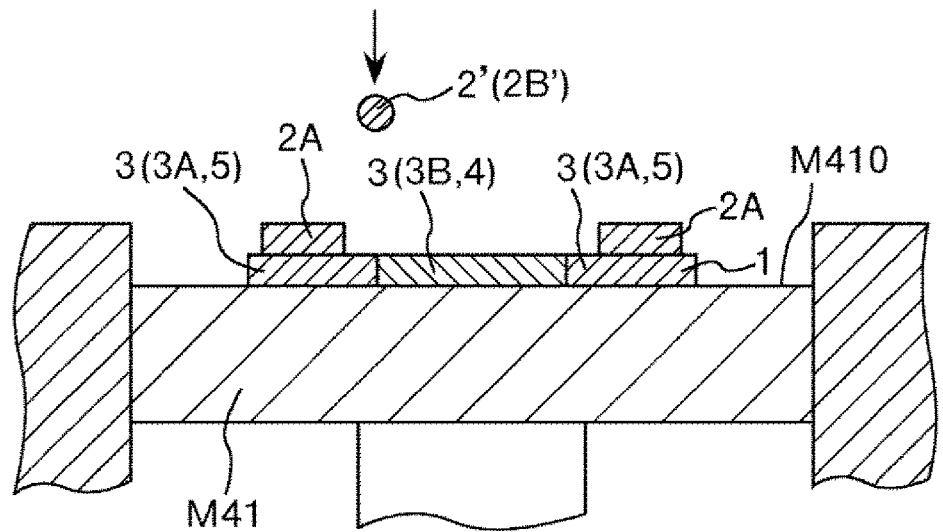
FIG. 6 is a vertical sectional view schematically showing a step (second pattern forming step (layer forming step)) of the production method for a three-dimensional shaped article of the preferred embodiment of the invention.
Figure 7:
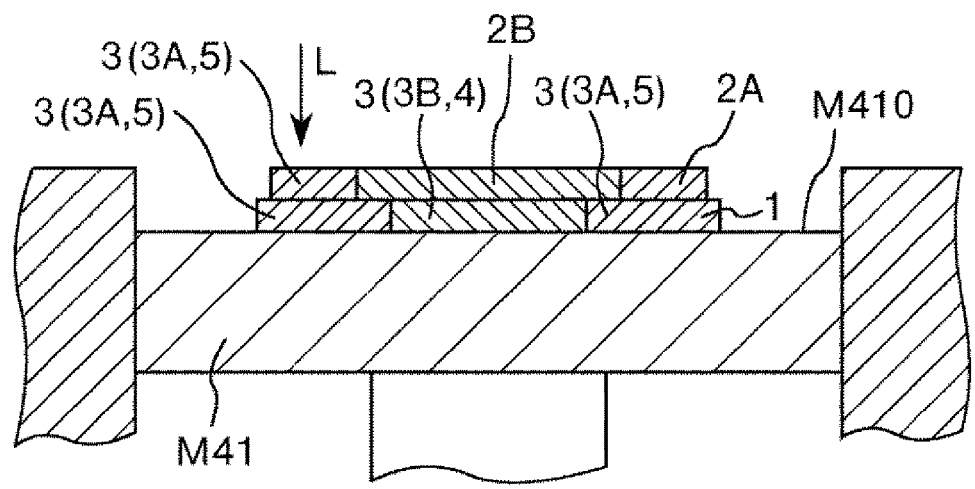
FIG. 7 is a vertical sectional view schematically showing a step (joining step (first joining step)) of the production method for a three-dimensional shaped article of the preferred embodiment of the invention.
Figure 8:
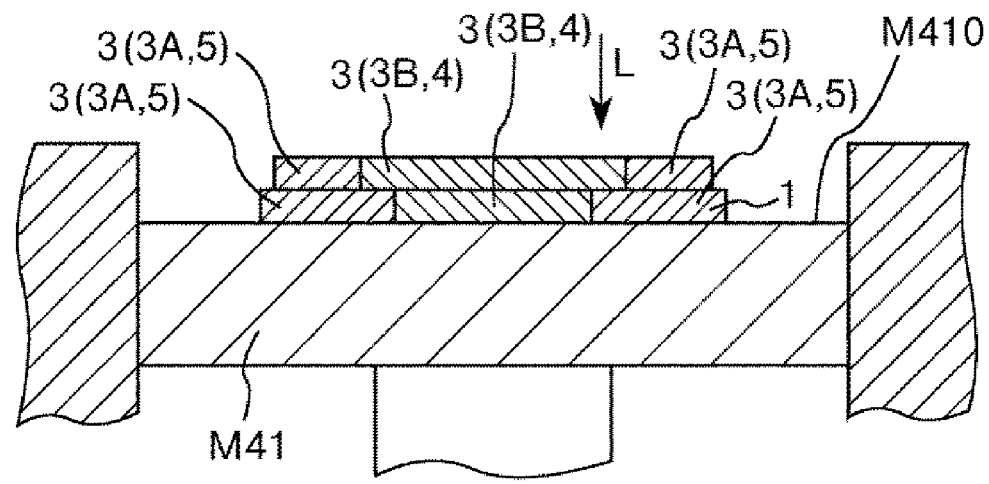
FIG. 8 is a vertical sectional view schematically showing a step (joining step (second joining step)) of the production method for a three-dimensional shaped article of the preferred embodiment of the invention.
Figure 9:
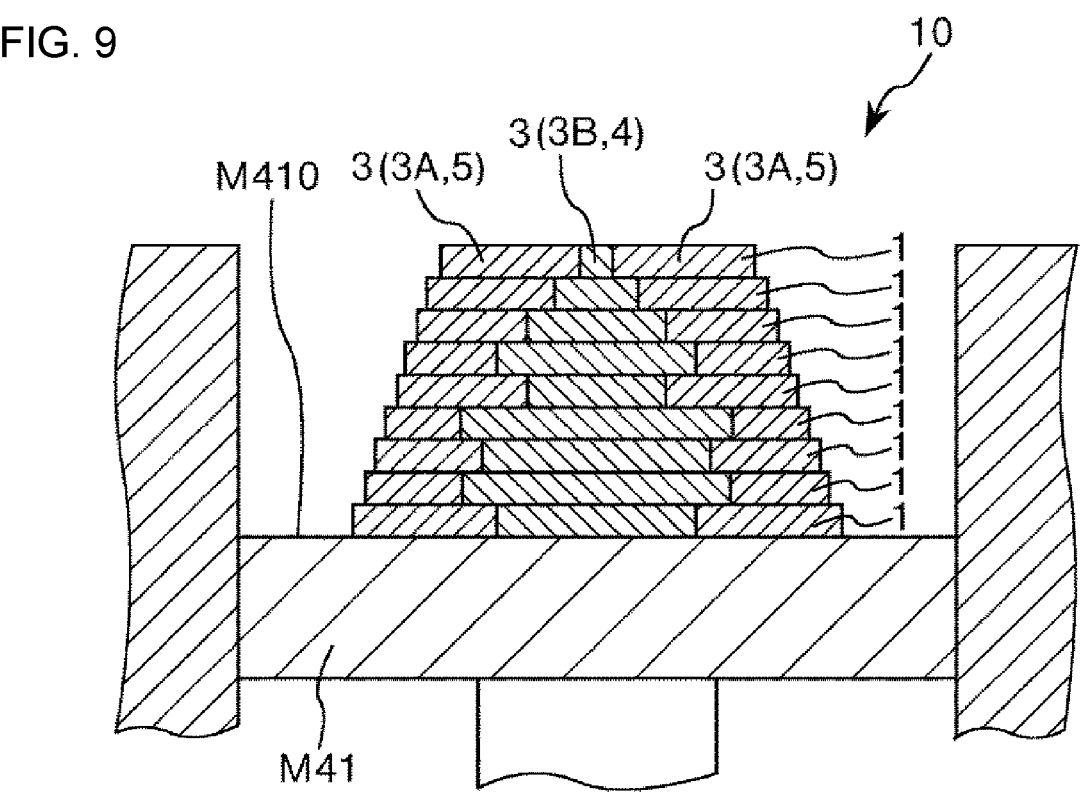
FIG. 9 is a vertical sectional view schematically showing a step of the production method for a three-dimensional shaped article of the preferred embodiment of the invention.

In a production method for a three-dimensional shaped article 10 of this embodiment, a series of steps including a layer forming step (see FIGS. 1, 2, 5, and 6) of forming a layer using a three-dimensional shaped article producing composition (composition) 2' containing a plurality of particles (dispersoids) 21, a solvent for dispersing the particles 21, and a binder having a function to temporarily join the particles 21 to one another in a state where the solvent is removed, a solvent removing step of removing the solvent contained in the layer 1, and a joining step (see FIGS. 3, 4, 7, and 8) of joining the particles 21 contained in the layer 1 to one another by irradiating the layer 1 with a laser beam is repeatedly performed (see FIG. 9). Then, in the formation of the layer 1, the three-dimensional shaped article producing composition 2' in which a volume-based average particle diameter of the particles 21 is 0.1 μm or more and less than 50 μm, and a content ratio of the binder in the three-dimensional shaped article producing composition 2' is 1.5 vol % or more and 10 vol % or less is used.

According to this, a production method for the three-dimensional shaped article 10 that can effectively prevent undesirable scattering of the particles 21 or a molten material thereof (hereinafter also simply referred to as "undesirable scattering of the particles 21 or the like") in a production process for the three-dimensional shaped article 10 and that can efficiently produce the three-dimensional shaped article 10 having excellent dimensional accuracy can be provided.

More specifically, in the related art, there was a problem that when a layer containing a plurality of particles is irradiated with a laser beam, due to the energy thereof, the particles are sometimes flicked out from the original position in the layer or a liquid pool of the molten material of the particles (molten pool) undulates, and the molten material is sometimes flicked out accompanying the scanning of a laser beam or the like, and this causes undesirable irregularities in the surface of the layer after it is irradiated with a laser beam, and the dimensional accuracy of the three-dimensional shaped article to be finally obtained is deteriorated. Particularly, due to the adhesion of the flicked out particles or the like to another site, a problem as described above became prominent. On the other hand, the invention is characterized in that the occurrence of a problem as described above can be prevented by using a three-dimensional shaped article producing composition that contains a plurality of particles, a solvent for dispersing the particles, and a binder having a function to temporarily join the particles to one another in a state where the solvent is removed, wherein a volume-based average particle diameter of the particles is 0.1 μm or more and less than 50 μm, and a content ratio of the binder is 1.5 vol % or more and 10 vol % or less in the formation of the layer.

On the other hand, when the above-mentioned conditions are not satisfied, an excellent effect as described above is not obtained.

For example, when the volume-based average particle diameter of the particles in the three-dimensional shaped article producing composition is less than the above-mentioned lower limit, the fluidity of the three-dimensional shaped article producing composition is further decreased, and the ease of handling of the three-dimensional shaped article producing composition is decreased, and also the productivity of the three-dimensional shaped article is decreased. Further, scattering of the particles or the like when being irradiated with a laser beam is likely to occur, and the dimensional accuracy of the three-dimensional shaped article to be obtained finally is deteriorated. In addition, when the volume-based average particle diameter of the particles is particularly small, aggregation of the particles in the three-dimensional shaped article producing composition is likely to occur, and undesirable irregularities in the surface of the layer are likely to occur at a stage before it is irradiated with a laser beam. As a result, the dimensional accuracy of the three-dimensional shaped article is particularly deteriorated also by together with the effect of scattering of the particles or the like when being irradiated with a laser beam.

Further, when the volume-based average particle diameter of the particles in the three-dimensional shaped article producing composition is the above-mentioned upper limit or more, due to an effect such that the ratio of the particles whose coverage with the binder is insufficient in the layer in a state where the solvent is removed is increased, irregularities in the surface of the layer are likely to occur depending on the size of the particles themselves, or the like, the dimensional accuracy of the three-dimensional shaped article is deteriorated. Further, it becomes difficult to improve the joining strength between the particles, and the mechanical strength of three-dimensional shaping is likely to decrease.

Further, when the content ratio of the binder in the three-dimensional shaped article producing composition is less than the above-mentioned lower limit, it becomes difficult to sufficiently improve the stability of the shape of the layer in a state where the solvent is removed, or due to an effect of scattering of the particles or the like when being irradiated with a laser beam, formation of a ball-like molten body by aggregation in melting, or the like, the dimensional accuracy of the three-dimensional shaped article to be finally obtained is deteriorated.

Further, when the content ratio of the binder in the three-dimensional shaped article producing composition exceeds the above-mentioned upper limit, the ratio of the particles accounting for the solid content in the three-dimensional shaped article producing composition becomes relatively low and the ratio of decrease in volume accompanying the removal of the binder in the production process for the three-dimensional shaped article is increased, and the dimensional accuracy of the three-dimensional shaped article to be finally obtained is deteriorated. Further, in the three-dimensional shaped article to be finally obtained, the content ratio of impurities (for example, carbon, etc.) derived from the binder may sometimes become high.

Incidentally, in the invention, the solvent is a liquid (dispersion medium) capable of dispersing particles and refers to a volatile liquid.

As described above, the volume-based average particle diameter of the particles 21 in the three-dimensional shaped article producing composition 2' may be 0.1 µm or more and less than 50 µm, but is preferably 0.2 µm or more and 20 µm or less, more preferably 0.3 µm or more and 10 µm or less. According to this, an effect as described above is more remarkably exhibited.

Further, the content ratio of the binder in the three-dimensional shaped article producing composition 2' may be 1.5 vol % or more and 10 vol % or less, but is preferably 1.6 vol % or more and 5.0 vol % or less, more preferably 1.7 vol % or more and 2.5 vol % or less. According to this, an effect as described above is more remarkably exhibited.

Further, in the production method of this embodiment, the layer forming step is performed using an entity portion forming composition 2B' (a composition containing particles (dispersoids) 21B) used for forming an entity portion 4 of the three-dimensional shaped article 10 and a support portion forming composition 2A' (a composition containing particles (dispersoids) 21A) used for forming a support portion (a supporting portion or a support material) 5 supporting a portion to become the entity portion 4 as the three-dimensional shaped article producing composition 2'. Then, the step includes a first pattern forming step (support portion pattern forming step) of forming a first pattern (support portion pattern) 2A by ejecting the support portion forming composition (composition) 2A' and a second pattern forming step (entity portion pattern forming step) of forming a second pattern (entity portion pattern) 2B by ejecting the entity portion forming composition (composition) 2B'.

In this manner, by forming not only a portion corresponding to the entity portion 4 of the three-dimensional shaped article 10, but also the support portion 5, undesirable deformation of the portion corresponding to the entity portion 4 can be more effectively prevented, and the dimensional accuracy of the three-dimensional shaped article 10 can be further improved. In addition, even the three-dimensional shaped article 10 having a more complicated shape can be favorably produced.

Then, at least one of the entity portion forming composition 2B' and the support portion forming composition 2A' as the three-dimensional shaped article producing composition 2' satisfies the above-mentioned conditions (in which a plurality of particles, a solvent for dispersing the particles, and a binder having a function to temporarily bind the particles to one another in a state where the solvent is removed are contained, a volume-based average particle diameter of the particles is 0.1 µm or more and less than 50 µm, and a content ratio of the binder is 1.5 vol % or more and 10 vol % or less).

According to this, the dimensional accuracy and reliability of the three-dimensional shaped article 10 can be further improved.

It is sufficient that at least one of the entity portion forming composition 2B' and the support portion forming composition 2A' as the three-dimensional shaped article producing composition 2' satisfies the above-mentioned conditions, however, in the following description, a case where both of the entity portion forming composition 2B' and the support portion forming composition 2A' satisfy the above-mentioned conditions will be mainly described.

Hereinafter, the respective steps will be described in detail.

First Pattern Forming Step

In the first pattern forming step, the first pattern 2A is formed by ejecting the support portion forming composition 2A', for example, on a plane M410 of a stage M41.

By forming the first pattern 2A by ejecting the support portion forming composition 2A' in this manner, even a pattern having a fine shape or a complicated shape can be favorably formed.

A method for ejecting the support portion forming composition 2A' is not particularly limited, and the ejection can also be performed using, for example, an inkjet apparatus or the like, but it is preferably ejected by a dispenser.

In this manner, by performing ejection of the support portion forming composition 2A' using a dispenser, even the support portion forming composition 2A' having a high viscosity can be favorably supplied (ejected), and dripping or the like of the support portion forming composition 2A' after the support portion forming composition 2A' comes in contact with a target site can be more effectively prevented. As a result, the dimensional accuracy of the three-dimensional shaped article 10 to be finally obtained can be further improved. In addition, by using the support portion forming composition 2A' having a high viscosity, the layer 1 having a relatively large thickness can be easily formed, and the productivity of the three-dimensional shaped article 10 can be further improved.

The support portion forming composition 2A' may be in the form of, for example, a paste.

The viscosity of the support portion forming composition 2A' in this step is preferably 100 mPa·s or more and 1,000,000 mPa·s or less, more preferably 500 mPa·s or more and 100,000 mPa·s or less, further more preferably 1,000 mPa·s or more and 20,000 mPa·s or less.

According to this, for example, the ejection stability of the support portion forming composition 2A' can be further improved, and also the composition is suitable for forming the layer 1 having a moderate thickness, and the productivity of the three-dimensional shaped article 10 can be further improved. In addition, the excessive wet-spreading of the support portion forming composition 2A' coming in contact with the adherend is more effectively prevented, and the dimensional accuracy of the three-dimensional shaped article 10 to be finally obtained can be further improved.

Incidentally, in this description, the viscosity refers to a value measured using a rheometer under the condition that the shear rate is 10 $[s^{-1}]$ unless otherwise specified.

In this step, the support portion forming composition 2A' may be ejected in the form of a continuous body or as a plurality of liquid droplets, but is preferably ejected as a plurality of liquid droplets.

According to this, for example, it can also be more favorably applied to the production of the three-dimensional shaped article 10 having a fine structure, and the dimensional accuracy of the three-dimensional shaped article 10 can be further improved.

When the support portion forming composition 2A' is ejected as a plurality of liquid droplets in this step, the volume per liquid droplet to be ejected is preferably 1 pL or more and 100,000 pL (100 nL) or less, more preferably 10 pL or more and 50,000 pL (50 nL) or less.

According to this, for example, the composition can also be more favorably applied to the production of the three-dimensional shaped article 10 having a fine structure, and the dimensional accuracy of the three-dimensional shaped article 10 can be further improved, and also the productivity of the three-dimensional shaped article 10 can be further improved.

In the production of the three-dimensional shaped article 10, as the support portion forming composition 2A', a plurality of types of compositions may be used.

Incidentally, the support portion forming composition 2A' will be described in detail later.

Second Pattern Forming Step

In the second pattern forming step, the second pattern 2B is formed by ejecting the entity portion forming composition 2B'.

By forming the second pattern 2B by ejecting the entity portion forming composition 2B' in this manner, even a pattern having a fine shape or a complicated shape can be favorably formed.

Particularly, in this embodiment, the entity portion forming composition 2B' is ejected in a region surrounded by the first pattern 2A so that the entire periphery of the second pattern 2B is in contact with the first pattern 2A.

According to this, the dimensional accuracy of the three-dimensional shaped article 10 to be finally obtained can be further improved.

A method for ejecting the entity portion forming composition 2B' is not particularly limited, and the ejection can also be performed using, for example, an inkjet apparatus or the like, but it is preferably ejected by a dispenser.

In this manner, by performing ejection of the entity portion forming composition 2B' using a dispenser, even the entity portion forming composition 2B' having a high viscosity can be favorably supplied (ejected), and dripping or the like of the entity portion forming composition 2B' after the entity portion forming composition 2B' comes in contact with a target site can be more effectively prevented. As a result, the dimensional accuracy of the three-dimensional shaped article 10 to be finally obtained can be further improved. In addition, by using the entity portion forming composition 2B' having a high viscosity, the layer 1 having a relatively large thickness can be easily formed, and the productivity of the three-dimensional shaped article 10 can be further improved.

The entity portion forming composition 2B' may be in the form of, for example, a paste.

The viscosity of the entity portion forming composition 2B' in this step is preferably 100 mPa·s or more and 1,000,000 mPa·s or less, more preferably 500 mPa·s or more and 100,000 mPa·s or less, further more preferably 1,000 mPa·s or more and 20,000 mPa·s or less.

According to this, for example, the ejection stability of the entity portion forming composition 2B' can be further improved, and also the composition is suitable for forming the layer 1 having a moderate thickness, and the productivity of the three-dimensional shaped article 10 can be further improved. In addition, the excessive wet-spreading of the entity portion forming composition 2B' coming in contact with the adherend is more effectively prevented, and the dimensional accuracy of the three-dimensional shaped article 10 to be finally obtained can be further improved.

In this step, the entity portion forming composition 2B' may be ejected in the form of a continuous body or as a plurality of liquid droplets, but is preferably ejected as a plurality of liquid droplets.

According to this, for example, it can also be more favorably applied to the production of the three-dimensional shaped article 10 having a fine structure, and the dimensional accuracy of the three-dimensional shaped article 10 can be further improved.

When the entity portion forming composition 2B' is ejected as a plurality of liquid droplets in this step, the volume per liquid droplet to be ejected is preferably 1 pL or more and 100,000 pL (100 nL) or less, more preferably 10 pL or more and 50,000 pL (50 nL) or less.

According to this, for example, the composition can also be more favorably applied to the production of the three-dimensional shaped article 10 having a fine structure, and the dimensional accuracy of the three-dimensional shaped article 10 can be further improved, and also the productivity of the three-dimensional shaped article 10 can be further improved.

In the production of the three-dimensional shaped article 10, as the entity portion forming composition 2B', a plurality of types of compositions may be used.

By doing this, for example, materials can be combined according to the properties required for the respective portions of the three-dimensional shaped article 10, and therefore, the properties (including appearance, functionality (for example, elasticity, toughness, heat resistance, corrosion resistance, or the like), etc.) of the three-dimensional shaped article 10 as a whole can be further improved.

Incidentally, the entity portion forming composition 2B' will be described in detail later.

By performing the first pattern forming step and the second pattern forming step as described above, the layer 1 having the first pattern 2A and the second pattern 2B is formed. In other words, the layer forming step includes the first pattern forming step and the second pattern forming step.

The thickness of each layer 1 formed using the support portion forming composition 2A' and the entity portion forming composition 2B' is not particularly limited, but is preferably 10 μm or more and 500 μm or less, more preferably 20 μm or more and 250 μm or less.

According to this, the dimensional accuracy of the three-dimensional shaped article 10 can be further improved while improving the productivity of the three-dimensional shaped article 10.

Solvent Removing Step

In the solvent removing step, the solvent contained in the layer 1 is removed.

According to this, the fluidity of the layer 1 is decreased, and the stability of the shape of the layer 1 is improved. In addition, by performing this step, undesirable deformation involved in sudden volatilization (explosive boil or the like) or the like of the solvent in the subsequent joining step can be effectively prevented. As a result, the three-dimensional shaped article 10 having excellent dimensional accuracy can be more reliably obtained, and the reliability of the three-dimensional shaped article 10 can be further improved, and also the productivity of the three-dimensional shaped article 10 can be further improved.

As a method for removing the solvent, for example, heating of the layer 1, irradiation of the layer 1 with an infrared ray, placement of the layer 1 under reduced pressure, supply of a gas with a low liquid component content ratio (for example, a gas with a relative humidity of 30% or less) such as dry air, etc. are exemplified. Further, two or more methods selected from these may be performed in combination.

Incidentally, this step may be performed concurrently with, for example, the above-mentioned layer forming step. More specifically, for example, before a predetermined pattern (layer 1) is completed by ejecting the three-dimensional shaped article producing composition 2', a treatment for removing the solvent from the ejected three-dimensional shaped article producing composition 2' may be performed. Alternatively, the solvent removing step (first solvent removing step) may be performed for the first pattern 2A completed in the first pattern forming step, and thereafter, the solvent removing step (second solvent removing step) may be performed for the second pattern 2B completed in the second pattern forming step.

Further, in this step, it is not necessary to completely remove the solvent contained in the layer 1.

The content ratio of the solvent in the layer 1 after this step is preferably 0.1 mass % or more and 25 mass % or less, more preferably 0.5 mass % or more and 20 mass % or less.

According to this, undesirable deformation involved in sudden volatilization (explosive boil or the like) or the like of the solvent in the later step is effectively prevented, and further, the three-dimensional shaped article 10 having excellent dimensional accuracy can be more reliably obtained, and the reliability of the three-dimensional shaped article 10 can be further improved, and also the productivity of the three-dimensional shaped article 10 can be further improved.

Joining Step

In the joining step, the layer 1 is irradiated (scanned) with a laser beam (see FIGS. 3, 4, 7, and 8).

According to this, the particles 21 contained in the three-dimensional shaped article producing composition 2' are joined to one another, thereby forming a joined portion 3. By forming the joined portion 3 in this manner, undesirable migration of the particles 21 thereafter is prevented, and the dimensional accuracy of the three-dimensional shaped article 10 can be improved. Further, in the joined portion 3 formed in this manner, generally, the particles 21 are joined to one another with a sufficient joining strength. Further, when the layer 1 in which the joined portion 3 is formed is present on the lower side of the layer 1 to be irradiated with a laser beam, the joined portion 3 of the layer 1 on the lower side and the newly formed joined portion 3 are joined to each other. As a result, the mechanical strength of the three-dimensional shaped article 10 to be finally obtained can be improved.

Further, by using a laser beam, energy can be applied to a desired site with high selectivity, and therefore, it is advantageous in terms of improvement of the dimensional accuracy of the three-dimensional shaped article 10 and is advantageous also in terms of improvement of the productivity of the three-dimensional shaped article 10. Further, the energy efficiency can be improved, and therefore, it is advantageous also in terms of saving energy.

Further, in this step, by the irradiation with a laser beam, the particles 21 are joined, and also unnecessary components other than the particles 21 can be removed. For example, the binder, the solvent, and the like can be removed, and these components can be effectively prevented from remaining in the joined portion 3 to be formed.

Further, by using the three-dimensional shaped article producing composition 2' satisfying the predetermined conditions (the three-dimensional shaped article producing composition 2' in which the volume-based average particle diameter of the particles 21 in the three-dimensional shaped article producing composition 2' is 0.1 µm or more and less than 50 µm, and the content ratio of the binder is 1.5 vol % or more and 10 vol % or less), undesirable scattering of the particles 21 or the like due to energy of the irradiated laser beam is effectively prevented, and the three-dimensional shaped article 10 having excellent dimensional accuracy is obtained.

The joining form varies depending on the constituent material or the like of the particles 21, but for example, fusion, sintering, melt-solidification, etc. are exemplified.

Further, in the production method of this embodiment, the joining step includes a first joining step of joining the particles 21A to one another by irradiating the first pattern 2A formed using the support portion forming composition 2A' with a laser beam, thereby forming a joined portion (first joined portion) 3A and a second joining step of joining the particles 21B to one another by irradiating the second pattern 2B formed using the entity portion forming composition 2B' with a laser beam, thereby forming a joined portion (second joined portion) 3B. In other words, in this embodiment, the joined portion (second joined portion) 3B is formed in a portion to become the entity portion 4 of the three-dimensional shaped article 10 and also the joined portion (first joined portion) 3A functioning as the support portion 5 in the production process for the three-dimensional shaped article 10 is formed. By performing a joining treatment not only for the second pattern 2B to become the entity portion 4 of the three-dimensional shaped article 10, but also for the first pattern 2A in this manner, the stability of the shape of the support portion 5 supporting the portion to become the entity portion 4 can be further improved, and the occurrence of undesirable deformation in the production process for the three-dimensional shaped article 10 can be more effectively prevented, and the dimensional accuracy and reliability of the three-dimensional shaped article 10 to be finally obtained can be further improved.

As a laser that can be used in this step, for example, solid lasers such as a ruby laser, a YAG laser, a Nd:YAG laser, a titanium:sapphire laser, and a semiconductor laser; liquid lasers such as a dye laser; gas lasers such as a neutral atom laser (a helium neon laser or the like), an ion laser (an argon ion laser or the like), a molecular laser (a carbon dioxide gas laser, a nitrogen laser, or the like), an excimer laser, and a metal-vapor laser (a helium cadminium laser or the like); a free electron laser; chemical lasers such as an oxygen-iodine chemical laser and a hydrogen fluoride laser; a fiber laser, etc. are exemplified.

The thickness of the layer 1 having the joined portion 3 is not particularly limited, but is preferably 5 µm or more and 300 µm or less, more preferably 10 µm or more and 200 µm or less.

According to this, the dimensional accuracy of the three-dimensional shaped article 10 can be further improved while improving the productivity of the three-dimensional shaped article 10.

Incidentally, for example, the irradiation conditions of the laser beam (the type of the laser beam, the irradiation intensity, etc.) may be adjusted so as to be different at the respective sites in the layer 1.

More specifically, for example, the irradiation conditions of the laser (irradiation energy, etc.) may be adjusted such that the joining strength of the particles 21B in the joined portion 3A (support material 5) is smaller than the joining strength of the particles 21A in the joined portion 3B (entity portion 4). According to this, the removal of the support material 5 in the support material removing step can be more efficiently performed, so that the productivity of the three-dimensional shaped article 10 can be further improved, and also the occurrence of a defect in the three-dimensional shaped article 10 in the support material removing step can be more effectively prevented, and the dimensional accuracy and reliability of the three-dimensional shaped article 10 to be finally obtained can be further improved.

As described above, by preventing undesirable scattering of the particles 21 or the like, the occurrence of undesirable irregularities in the surface of the layer 1 after the joining step is effectively prevented.

Specifically, the arithmetic average height Sa (ISO 25178) of the surface of the layer 1 after the joining step is preferably 20 μm or less, more preferably 15 μm or less, further more preferably 10 μm or less.

According to this, the dimensional accuracy of the three-dimensional shaped article 10 to be finally obtained can be further improved.

Further, the maximum height Sz (ISO 25178) of the surface of the layer 1 after the joining step is preferably 400 μm or less, more preferably 250 μm or less, further more preferably 90 μm or less.

According to this, the dimensional accuracy of the three-dimensional shaped article 10 to be finally obtained can be further improved.

Support Portion Removing Step

Figure 10:
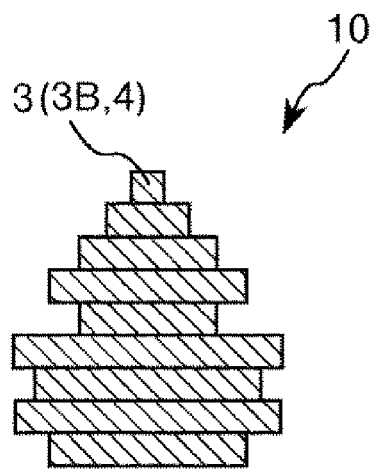
FIG. 10 is a vertical sectional view schematically showing a step (support portion removing step) of the production method for a three-dimensional shaped article of the preferred embodiment of the invention.

In this embodiment, after repeatedly performing a series of steps including the layer forming step (the first pattern forming step and the second pattern forming step), the solvent removing step, and the joining step (see FIG. 9), as a post-treatment step, the support material 5 is removed (see FIG. 10). By doing this, the three-dimensional shaped article 10 is taken out.

As a specific method of this step, for example, a method in which at least a part of the support material 5 is dissolved, a method in which the support material 5 is destroyed by smashing or the like, etc. are exemplified.

Figure 11:
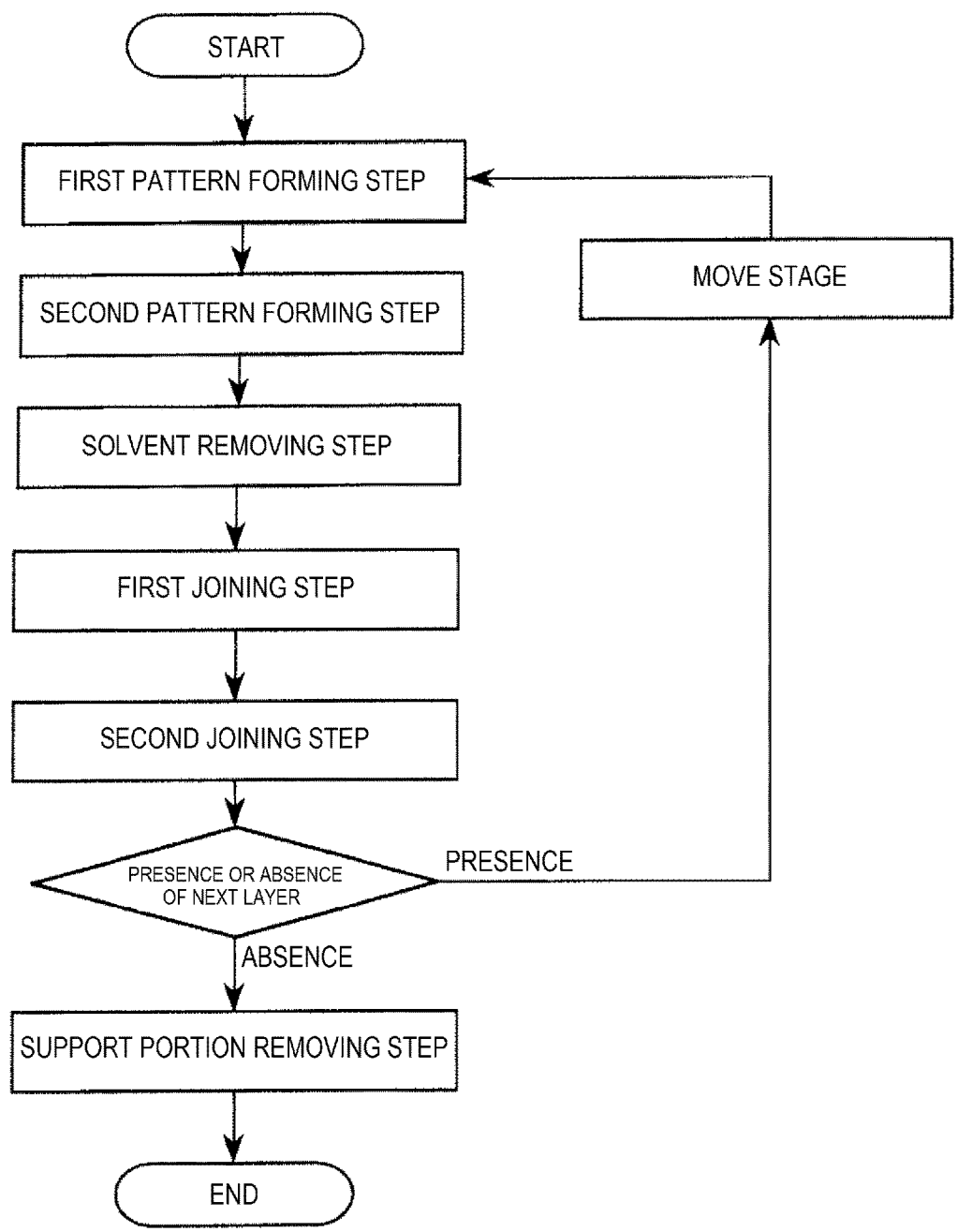
FIG. 11 is a flowchart showing the production method for a three-dimensional shaped article of the preferred embodiment of the invention.

The production method for the three-dimensional shaped article 10 as described above can be summarized in a flowchart as shown in FIG. 11.

In the production of the three-dimensional shaped article 10, a series of steps including the layer forming step (the first pattern forming step and the second pattern forming step), the solvent removing step, and the joining step is repeatedly performed as many times as specified, whereby a stacked body in which a plurality of layers 1 are stacked is obtained.

That is, it is determined whether a new layer 1 should be formed on the already formed layer 1, and when there is a layer 1 that should be formed, a new layer 1 is formed, and when there is no layer 1 that should be formed, the support portion removing step as a post-treatment is performed for the stacked body, whereby the target three-dimensional shaped article 10 is obtained.

Incidentally, in the configuration shown in the drawings, for facilitating understanding, the description has been made under the assumption that the respective steps described above are sequentially performed, however, different steps may be concurrently performed at the respective sites in the shaping region (a space on the stage).

Further, in the configuration shown in the drawings, the description has been made under the assumption that one layer 1 is formed by performing the above-mentioned series of steps once, however, the above-mentioned series of steps may be repeatedly performed for forming one layer. For example, one layer may be formed by performing the steps from the layer forming step (second pattern forming step) to the joining step for the entity portion forming composition 2B' after the steps from the layer forming step (first pattern forming step) to the joining step for the support portion forming composition 2A'.

According to the production method as described above, undesirable scattering of the particles 21 or the like in the production process for the three-dimensional shaped article 10 can be effectively prevented, and the three-dimensional shaped article 10 having excellent dimensional accuracy can be efficiently produced.

Three-Dimensional Shaped Article Producing Composition

Next, the three-dimensional shaped article producing composition of the invention will be described.

When a plurality of types of three-dimensional shaped article producing compositions are used in the production of the three-dimensional shaped article, at least one type of three-dimensional shaped article producing composition may be the three-dimensional shaped article producing composition of the invention (a composition in which a plurality of particles, a solvent (dispersion medium) for dispersing the particles, and a binder having a function to temporarily bind the particles to one another in a state where the solvent is removed are contained, the volume-based average particle diameter of the particles is 0.1 μm or more and less than 50 μm, and the content ratio of the binder is 1.5 vol % or more and 10 vol % or less).

According to this, undesirable scattering of the particles or the like in the production process for the three-dimensional shaped article can be effectively prevented, and the three-dimensional shaped article having excellent dimensional accuracy can be produced.

In this embodiment, as the three-dimensional shaped article producing composition, the entity portion forming composition 2B' and the support portion forming composition 2A' are used.

Entity Portion Forming Composition

First, the entity portion forming composition 2B' as the three-dimensional shaped article producing composition used for producing the three-dimensional shaped article 10 will be described.

The constituent component or the like of the entity portion forming composition 2B' is not particularly limited as long as the composition can be used for forming the entity portion 4 (forming the second pattern 2B), however, the composition preferably contains a plurality of particles 21B (main material particles), a solvent for dispersing the particles 21B, and a binder, and further, it is more preferred that the volume-based average particle diameter of the particles 21B is 0.1 μm or more and less than 50 μm, and the content ratio of the binder is 1.5 vol % or more and 10 vol % or less.

In the following description, a case where the entity portion forming composition 2B' is the three-dimensional shaped article producing composition of the invention, that is, a case where the composition contains a plurality of particles 21B, a solvent, and a binder, and the volume-based average particle diameter of the particles 21B is 0.1 μm or more and less than 50 μm, and the content ratio of the binder is 1.5 vol % or more and 10 vol % or less will be representatively described.

Particles

By including a plurality of particles 21B in the entity portion forming composition 2B', the range of choice of the constituent material of the three-dimensional shaped article 10 can be expanded, and the three-dimensional shaped article 10 having desired physical properties, texture, and the like can be favorably obtained. For example, when the three-dimensional shaped article is produced using a material dissolved in a solvent, there are limitations on the material that can be used, however, by using the entity portion forming composition 2B' containing the particles 21B, such limitations can be eliminated.

As the constituent material of the particles 21B contained in the entity portion forming composition 2B', for example, a metal material, a metal compound (a ceramic or the like), a resin material, a pigment, etc. are exemplified.

The entity portion forming composition 2B' preferably contains metal particles constituted by a material containing a metal material.

According to this, for example, the texture (high-quality texture and massive texture), mechanical strength, toughness, durability, and the like of the three-dimensional shaped article 10 can be further improved. In addition, heat transfer when energy for joining the particles 21B is applied efficiently proceeds, and therefore, while improving the productivity of the three-dimensional shaped article 10, the occurrence of an undesirable variation in temperature at the respective sites can be more effectively prevented, and the reliability of the three-dimensional shaped article 10 can be further improved.

As the metal material constituting the particles 21B, for example, magnesium, iron, copper, cobalt, titanium, chromium, nickel, aluminum, an alloy containing at least one type among these (for example, a maraging steel, a stainless steel, cobalt-chromium-molybdenum, a titanium alloy, a nickel-based alloy, an aluminum alloy, or the like), etc. are exemplified.

Further, when the particles 21B are constituted by a metal material having a low carbon content ratio (for example, a low-carbon stainless steel such as SUS 304L or SUS 316L, or the like), an effect as follow is obtained. That is, when a metal material having a low carbon content ratio (for example, a low-carbon stainless steel such as SUS 304L or SUS 316L, or the like) was used as a constituent material of a three-dimensional shaped article in the related art, a problem that carbon derived from the binder or the like is solid-dissolved in the metal material, so that the carbon content ratio in a three-dimensional shaped article to be finally obtained is undesirably increased occurred, however, according to the invention, the occurrence of such a problem can be effectively prevented.

The carbon content ratio in the particles 21B is preferably 0.10 mass % or less, more preferably 0.05 mass % or less, further more preferably 0.03 mass % or less.

According to this, an effect as described above is more remarkably exhibited.

Particularly, when the particles 21B are constituted by SUS 316L, corrosion resistance or the like of the three-dimensional shaped article 10 can be further improved, and an effect brought about by decreasing the carbon content ratio in the final three-dimensional shaped article 10 is more remarkably exhibited.

As the metal compound constituting the particles 21B, for example, various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; composites of these materials; etc. are exemplified.

As the resin material constituting the particles 21B, for example, polybutylene terephthalate, polyethylene terephthalate, polypropylene, polystyrene, syndiotactic polystyrene, polyacetal, modified polyphenylene ether, polyether ether ketone, polycarbonate, an acrylonitrile-butadiene-styrene copolymer (ABS resin), polyether nitrile, a polyamide (nylon or the like), polyarylate, polyamideimide, polyetherimide, polyimide, a liquid crystalline polymer, polysulfone, polyethersulfone, polyphenylene sulfide, a fluororesin, etc. are exemplified.

The shape of the particle 21B is not particularly limited, and may be any shape such as a spherical shape, a spindle shape, a needle shape, a cylindrical shape, or a flaky shape, and further, it may be an irregular shape, but is preferably a spherical shape.

The average particle diameter of the particles 21B is preferably 0.1 μm or more and less than 50 μm, more preferably 0.2 μm or more and 20 μm or less, further more preferably 0.3 μm or more and 10 μm or less.

According to this, an effect as described above is more remarkably exhibited, and the mechanical strength and dimensional accuracy of the three-dimensional shaped article 10 to be produced can be further improved while further improving the productivity of the three-dimensional shaped article 10.

Particularly, when the entity portion forming composition 2B' contains metal particles constituted by SUS 316L as the particles 21B, the volume-based average particle diameter of the particles 21B is preferably 0.1 μm or more and 10 μm or less, more preferably 0.2 μm or more and 7.0 μm or less, further more preferably 0.3 μm or more and 4.0 μm or less.

According to this, while further improving the productivity of the three-dimensional shaped article 10, the mechanical strength and dimensional accuracy of the three-dimensional shaped article 10 to be produced can be further improved, and also the solid-dissolution of carbon derived from the binder or the like can be more effectively prevented, and an undesirable increase in the carbon content ratio in the three-dimensional shaped article 10 can be more effectively prevented.

Incidentally, in the invention, the average particle diameter refers to a volume-based average particle diameter and can be determined by, for example, subjecting a dispersion liquid obtained by adding a sample to methanol and dispersing the sample therein for 3 minutes with an ultrasonic disperser to measurement by a particle size distribution analyzer employing a Coulter counter method (model TA-II, manufactured by COULTER ELECTRONICS INS) using an aperture of 50 μm.

The Dmax of the particles 21B is preferably 0.2 μm or more and 80 μm or less, more preferably 0.4 μm or more and 40 μm or less, further more preferably 0.5 μm or more and 20 μm or less.

According to this, the fluidity of the entity portion forming composition 2B' becomes more favorable, and therefore, the second pattern forming step can be more smoothly performed, and also the joining of the particles 21B in the joining step can be more favorably performed. As a result, while further improving the productivity of the three-dimensional shaped article 10, the mechanical strength of the three-dimensional shaped article 10 to be produced can be further improved, and the occurrence of undesirable irregularities or the like in the three-dimensional shaped article 10 to be produced can be more effectively prevented, and the dimensional accuracy of the three-dimensional shaped article 10 can be further improved.

The content ratio of the particles 21B in the entity portion forming composition 2B' is preferably 30 mass % or more and 93 mass % or less, more preferably 35 mass % or more and 88 mass % or less.

According to this, while further improving the ease of handling of the entity portion forming composition 2B', the amount of components to be removed in the production process for the three-dimensional shaped article 10 can be further reduced, and therefore, it is particularly advantageous in terms of the productivity of the three-dimensional shaped article 10, the production cost thereof, saving resources, and the like. In addition, the dimensional accuracy of the three-dimensional shaped article 10 to be finally obtained can be further improved.

Incidentally, the particles 21B are constituted by a material to undergo a chemical reaction (for example, an oxidation reaction or the like) in the production process for the three-dimensional shaped article 10 (for example, the joining step or the like), and the formulation of the particles 21B contained in the entity portion forming composition 2B' may be different from the formulation of the constituent material of the final three-dimensional shaped article 10.

Further, the entity portion forming composition 2B' may contain two or more types of particles 21B.

Solvent

By including the solvent (dispersion medium) in the entity portion forming composition 2B', the particles 21B can be favorably dispersed in the entity portion forming composition 2B', and the ejection of the entity portion forming composition 2B' by a dispenser or the like can be stably performed.

The solvent is not particularly limited as long as it has a function (a function as the dispersion medium) to disperse the particles 21B in the entity portion forming composition 2B', however, for example, water; ethers such as ethylene glycol monomethyl ether, ethylene glycol monoethyl ether, propylene glycol monomethyl ether, propylene glycol monoethyl ether, diethyl diglycol, and diethylene glycol monobutyl ether acetate; acetate esters such as ethyl acetate, n-propyl acetate, iso-propyl acetate, n-butyl acetate, and iso-butyl acetate; carbitols such as carbitol and an ester compound thereof (for example, carbitol acetate or the like); cellosolves such as cellosolve and an ester compound thereof (for example, cellosolve acetate or the like); aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as monohydric alcohols such as ethanol, propanol, and butanol, and polyhydric alcohols such as ethylene glycol, propylene glycol, butane- diol, and glycerin; sulfoxide-based solvents such as dimethyl sulfoxide and diethyl sulfoxide; pyridine-based solvents such as pyridine, picoline (α-picoline, β-picoline, and γ-picoline), and 2,6-lutidine; and ionic liquids such as a tetraalkylammonium acetate (for example, tetrabutylammonium acetate or the like); etc. are exemplified, and one type or two or more types in combination selected from these can be used.

Particularly, when the entity portion forming composition 2B' contains polyvinyl alcohol as the binder, the entity portion forming composition 2B' preferably contains a polyhydric alcohol as the solvent.

According to this, the solubility of the binder in the solvent in the entity portion forming composition 2B' can be further improved, and the storage stability, viscosity, ejectability, and the like of the entity portion forming composition 2B' can be further improved.

Further, when the entity portion forming composition 2B' contains an acrylic resin as the binder, the entity portion forming composition 2B' preferably contains an ether as the solvent.

According to this, the solubility of the binder in the solvent in the entity portion forming composition 2B' can be further improved, and the storage stability, viscosity, ejectability, and the like of the entity portion forming composition 2B' can be further improved. In addition, the removal of the solvent in the solvent removing step can be more favorably performed, and the productivity of the three-dimensional shaped article 10 can be further improved.

The content of the solvent in the entity portion forming composition 2B' is preferably 5 mass % or more and 68 mass % or less, more preferably 8 mass % or more and 60 mass % or less.

According to this, while further improving the ease of handling of the entity portion forming composition 2B', the productivity of the three-dimensional shaped article 10 can be further improved, and also it is particularly advantageous also in terms of the production cost, saving resources, and the like. Further, the dimensional accuracy of the three-dimensional shaped article 10 to be finally obtained can be further improved.

Binder

The binder has a function to temporarily bind the particles 21B to one another in a state where the solvent is removed.

By including the binder in the entity portion forming composition 2B', for example, undesirable deformation of the second pattern 2B formed using the entity portion forming composition 2B' can be effectively prevented.

Further, undesirable scattering of the particles 21B or a molten material thereof when being irradiated with a laser beam in the joining step can be effectively prevented. According to this, the occurrence of undesirable irregularities in the surface of the layer 1 in which the joined portion 3 is formed can be effectively prevented.

As a result, the dimensional accuracy of the three-dimensional shaped article 10 can be improved.

The binder may be any as long as it has a function to temporarily fix the particles 21B in the entity portion forming composition 2B' (second pattern 2B) before being subjected to the joining step, and for example, various resin materials such as a thermoplastic resin and a curable resin, and the like can be used.

When a curable resin is contained, a curing reaction of the curable resin may be performed at a timing after ejection of the entity portion forming composition 2B' and before the joining step.

According to this, undesirable deformation of the second pattern 2B formed using the entity portion forming composition 2B' can be more effectively prevented, and the dimensional accuracy of the three-dimensional shaped article 10 can be further improved.

A curing treatment in which the curing reaction of the curable resin is allowed to proceed can be performed by, for example, heating or irradiation with an energy ray such as a UV ray.

As the curable resin, for example, various thermosetting resins, photocurable resins, and the like can be favorably used.

As the curable resin (polymerizable compound), for example, various monomers, various oligomers (including dimers, trimers, etc.), prepolymers, and the like can be used.

As the curable resin (polymerizable compound), a compound whose addition polymerization or ring-opening polymerization is initiated by a radical species, a cationic species, or the like generated from a polymerization initiator by irradiation with an energy ray, thereby forming a polymer is preferably used. As the polymerization form of the addition polymerization, radical, cationic, anionic, metathesis, and coordination polymerization are exemplified. Further, as the polymerization form of the ring-opening polymerization, cationic, anionic, radical, metathesis, and coordination polymerization are exemplified.

As specific examples of the binder, for example, an acrylic resin, an epoxy resin, a silicone resin, polyvinyl alcohol, PLA (polylactic acid), PA (polyamide), PPS (polyphenylene sulfide), etc. are exemplified.

Particularly, the binder preferably contains at least one of polyvinyl alcohol and an acrylic resin.

According to this, undesirable scattering of the particles 21 or the like can be more effectively prevented, and the dimensional accuracy of the three-dimensional shaped article 10 can be further improved, and also the binder or a decomposition product thereof can be more effectively prevented from undesirably remaining in the three-dimensional shaped article 10 to be finally obtained.

Further, by including polyvinyl alcohol, the smoothness of the surface of the layer 1 can be improved, and the dimensional accuracy of the three-dimensional shaped article 10 can be further improved.

In the entity portion forming composition 2B', the binder may be contained in any form, however, the entity portion forming composition 2B' preferably contains a component in the form of a liquid (for example, in a molten state, a dissolved state, or the like) as the binder. That is, at least a part of the binder is preferably contained as a constituent component of a dispersion medium.

According to this, the binder can function as a dispersion medium for dispersing the particles 21B, and the preservability of the entity portion forming composition 2B' can be further improved.

Further, the entity portion forming composition 2B' may contain nanocellulose as the binder.

The nanocellulose is a fibrous material that is constituted by cellulose or a derivative of cellulose and that has a width and a thickness of 100 nm or less, and is a concept including a so-called cellulose nanofiber or cellulose nanocrystal.

By including such nanocellulose, the viscosity of the entire entity portion forming composition 2B' can be adjusted within a favorable range at a relatively low content ratio. As a result, for example, even if the content ratio of the particles 21B or the content ratio of the binder other than the nanocellulose in the entity portion forming composition 2B' is not set high, the viscosity of the entity portion forming composition 2B' can be sufficiently increased. Therefore, undesirable deformation of the layer 1 can be prevented while effectively preventing undesirable aggregation of the particles 21B in the entity portion forming composition 2B' or an undesirable variation in formulation or the like in the entity portion forming composition 2B' or in the three-dimensional shaped article 10. On the other hand, the entity portion forming composition 2B' containing nanocellulose has thixotropy, and the viscosity of the entity portion forming composition 2B' decreases in a state where shear stress is applied as when the composition is ejected, and stable ejection can be performed. Further, the amount of the binder contained in the entity portion forming composition 2B' can be reduced, and therefore, the binder or a decomposition product thereof can be more effectively prevented from undesirably remaining in the three-dimensional shaped article 10 to be finally obtained. Further, for the above reasons, the dimensional accuracy, reliability, and the like of the three-dimensional shaped article 10 can be further improved. In addition, when the entity portion forming composition 2B' contains nanocellulose together with the binder other than the nanocellulose, these synergistically act to effectively exhibit the temporary binding function in a smaller amount, and an effect as described above is more remarkably exhibited.

The width and thickness of the nanocellulose may be 100 nm or less, but is preferably 1 nm or more and 80 nm or less, more preferably 4 nm or more and 70 nm or less, further more preferably 10 nm or more and 50 nm or less.

According to this, an effect as described above is more remarkably exhibited.

The length of the nanocellulose is not particularly limited, but is preferably 100 nm or more, more preferably 100 nm or more and 50 μm or less, further more preferably 150 nm or more and 30 μm or less.

According to this, an effect as described above is more remarkably exhibited.

Further, the aspect ratio of a fiber of the nanocellulose is preferably 3 or more and 2,000 or less, more preferably 5 or more and 1,000 or less, further more preferably 7 or more and 600 or less.

According to this, an effect as described above is more remarkably exhibited.

The nanocellulose may be present independently of the particles 21B, but preferably covers the surfaces of the particles 21B in the entity portion forming composition 2B'.

According to this, when the hardness of the particles 21B is relatively high (for example, when the particles 21B are constituted by a metal material or a ceramic material, or the like), a coating layer formed of the nanocellulose functions as a cushioning layer, and for example, can effectively prevent and suppress abrasion of the ejection portion (particularly, a nozzle of a piston-type dispenser) of the entity portion forming composition 2B', and stable ejection of the entity portion forming composition 2B' can be performed over a long period of time. Further, the effect of the nanocellulose as the binder is more effectively exhibited.

When the surfaces of the particles 21B are covered with the nanocellulose, the coverage of the surfaces of the particles 21B with the nanocellulose is preferably 20% or more and 100% or less, more preferably 50% or more and 100% or less, further more preferably 80% or more and 100% or less.

According to this, an effect as described above is more remarkably exhibited.

The content ratio of the nanocellulose in the entity portion forming composition 2B' is preferably 0.02 vol % or more and 0.42 vol % or less, more preferably 0.04 vol % or more and 0.40 vol % or less, further more preferably 0.06 vol % or more and 0.38 vol % or less.

According to this, the preservability and ejectability of the entity portion forming composition 2B' can be further improved, and also the dimensional accuracy of the three-dimensional shaped article 10 can be further improved. In addition, the nanocellulose can be more reliably prevented from undesirably remaining in the final three-dimensional shaped article 10.

The content ratio of the binder in the entity portion forming composition 2B' may be 1.5 vol % or more and 10 vol % or less, but is preferably 2.0 vol % or more and 9.5 vol % or less, more preferably 2.5 vol % or more and 9.0 vol % or less, further more preferably 3.0 vol % or more and 8.5 vol % or less.

According to this, an effect as described above is more remarkably exhibited, and while further improving the productivity of the three-dimensional shaped article 10, the dimensional accuracy and reliability of the three-dimensional shaped article 10 to be produced can be further improved Above all, when the particles 21 are metal particles constituted by a metal material having a low carbon content ratio (for example, a low-carbon stainless steel such as SUS 304L or SUS 316L, or the like), particularly, when the particles 21 are constituted by SUS 316L, the content ratio of the binder in the entity portion forming composition 2B' is preferably 1.5 vol % or more and 2.1 vol % or less, more preferably 1.6 vol % or more and 2.0 vol % or less, further more preferably 1.7 vol % or more and 1.9 vol % or less.

According to this, the content ratio of carbon in the three-dimensional shaped article 10 to be finally obtained can be more reliably decreased, and for example, in shaping of SUS 316L, the shaping in which the carbon content ratio is suppressed to not more than 0.03 mass % being the standard value of the solid-dissolved carbon amount of SUS 316L can be achieved, and also the dimensional accuracy of the three-dimensional shaped article 10 can be further improved.

Other Components

Further, the entity portion forming composition 2B' may contain a component other than the above-mentioned components. As such a component, for example, a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, a pH adjusting agent, etc. are exemplified.

Support Portion Forming Composition

Next, the support portion forming composition 2A' as the three-dimensional shaped article producing composition used for producing the three-dimensional shaped article 10 will be described.

The constituent component or the like of the support portion forming composition 2A' is not particularly limited as long as the composition can be used for forming the support portion 5 (forming the first pattern 2A), however, the composition preferably contains a plurality of particles 21A (main material particles), a solvent for dispersing the particles 21A, and a binder, and further, it is more preferred that the volume-based average particle diameter of the particles 21A is 0.1 μm or more and less than 50 and the content ratio of the binder is 1.5 vol % or more and 10 vol % or less.

In the following description, a case where the support portion forming composition 2A' is the three-dimensional shaped article producing composition of the invention, that is, a case where the composition contains a plurality of particles 21A, a solvent, and a binder, and the volume-based average particle diameter of the particles 21A is 0.1 μm or more and less than 50 μm, and the content ratio of the binder is 1.5 vol % or more and 10 vol % or less will be representatively described.

Particles

By including a plurality of particles 21A in the support portion forming composition 2A', even when the support portion 5 (first pattern 2A) to be formed has a fine shape or the like, the support portion 5 can be efficiently formed with high dimensional accuracy. Further, the solvent or the binder (including a decomposition product) can be efficiently removed from voids among the plurality of particles 21A constituting the support portion 5, and the productivity of the three-dimensional shaped article 10 can be further improved, and also the reliability of the three-dimensional shaped article 10 can be further improved.

As the constituent material of the particles 21A contained in the support portion forming composition 2A', for example, the same materials as described as the constituent material of the particles 21B of the entity portion forming composition 2B' are exemplified. According to this, the same effect as described above is obtained.

However, the particles 21A constituting the support portion forming composition 2A' are preferably constituted by a material having a higher melting point than the particles 21B constituting the entity portion forming composition 2B'.

The shape of the particle 21A is not particularly limited, and may be any shape such as a spherical shape, a spindle shape, a needle shape, a cylindrical shape, or a flaky shape, and further, it may be an irregular shape, but is preferably a spherical shape.

The average particle diameter of the particles 21A is not particularly limited, but is preferably 0.1 μm or more and less than 50 μm, more preferably 0.2 μm or more and 20 μm or less, furthermore preferably 0.3 μm or more and 10 μm or less.

According to this, an effect as described above is more remarkably exhibited, and dimensional accuracy of the three-dimensional shaped article 10 to be produced can be further improved while further improving the productivity of the three-dimensional shaped article 10.

The Dmax of the particles 21A is preferably 0.2 μm or more and 80 μm or less, more preferably 0.4 μm or more and 40 μm or less, further more preferably 0.5 μm or more and 20 μm or less.

According to this, the fluidity of the support portion forming composition 2A' becomes more favorable, and therefore, supply of the support portion forming composition 2A' can be more smoothly performed. Further, the solvent or the binder (including a decomposition product) can be more efficiently removed from voids among the plurality of particles 21A constituting the support portion 5

(first pattern 2A), and the productivity of the three-dimensional shaped article 10 can be further improved.

The content ratio of the particles 21A in the support portion forming composition 2A' is preferably 30 mass % or more and 93 mass % or less, more preferably 35 mass % or more and 88 mass % or less.

According to this, while further improving the ease of handling of the support portion forming composition 2A', the amount of components to be removed in the production process for the three-dimensional shaped article 10 can be further reduced, and therefore, it is particularly advantageous in terms of the productivity of the three-dimensional shaped article 10, the production cost thereof, saving resources, and the like. In addition, the dimensional accuracy of the three-dimensional shaped article 10 to be finally obtained can be further improved.

Incidentally, the particles 21A are constituted by a material to undergo a chemical reaction (for example, an oxidation reaction or the like) in the production process for the three-dimensional shaped article 10 (for example, the joining step or the like), and the formulation of the particles 21A contained in the support portion forming composition 2A' may be different from the formulation of the constituent material of the final three-dimensional shaped article 10.

Further, the support portion forming composition 2A' may contain two or more types of particles 21A.

Solvent

By including the solvent in the support portion forming composition 2A', the particles can be favorably dispersed in the support portion forming composition 2A', and the ejection of the support portion forming composition 2A' by a dispenser or the like can be stably performed.

As the solvent contained in the support portion forming composition 2A', for example, the same solvents as described as the constituent material of the entity portion forming composition 2B' are exemplified. According to this, the same effect as described above is obtained.

Incidentally, the formulation of the solvent contained in the support portion forming composition 2A' may be the same as or different from the formulation of the solvent contained in the entity portion forming composition 2B'.

The content of the solvent in the support portion forming composition 2A' is preferably 5 mass % or more and 68 mass % or less, more preferably 8 mass % or more and 60 mass % or less.

According to this, while further improving the ease of handling of the support portion forming composition 2A', the amount of components to be removed in the production process for the three-dimensional shaped article 10 can be further reduced, and therefore, it is particularly advantageous in terms of the productivity of the three-dimensional shaped article 10, the production cost thereof, saving resources, and the like. In addition, the dimensional accuracy of the three-dimensional shaped article 10 to be finally obtained can be further improved.

Binder

By including the binder in the support portion forming composition 2A', for example, undesirable deformation of the first pattern 2A formed using the support portion forming composition 2A' can be effectively prevented.

Further, undesirable scattering of the particles 21A or a molten material thereof when being irradiated with a laser beam in the joining step can be effectively prevented. According to this, the occurrence of undesirable irregularities in the surface of the layer 1 in which the joined portion 3 is formed can be effectively prevented.

As a result, the dimensional accuracy of the three-dimensional shaped article 10 can be improved.

The binder may be any as long as it has a function to temporarily fix the particles 21A in the support portion forming composition 2A' (first pattern 2A) before being subjected to the joining step, and for example, various resin materials such as a thermoplastic resin and a curable resin, and the like can be used.

When a curable resin is contained, a curing reaction of the curable resin may be performed at a timing after ejection of the support portion forming composition 2A' and before the joining step.

According to this, undesirable deformation of the first pattern 2A formed using the support portion forming composition 2A' can be more effectively prevented, and the dimensional accuracy of the three-dimensional shaped article 10 can be further improved.

A curing treatment in which the curing reaction of the curable resin is allowed to proceed can be performed by, for example, heating or irradiation with an energy ray such as a UV ray.

As the curable resin, for example, various thermosetting resins, photocurable resins, and the like can be favorably used.

As the curable resin (polymerizable compound), for example, various monomers, various oligomers (including dimers, trimers, etc.), prepolymers, and the like can be used.

As the curable resin (polymerizable compound), a compound whose addition polymerization or ring-opening polymerization is initiated by a radical species, a cationic species, or the like generated from a polymerization initiator by irradiation with an energy ray, thereby forming a polymer is preferably used. As the polymerization form of the addition polymerization, radical, cationic, anionic, metathesis, and coordination polymerization are exemplified. Further, as the polymerization form of the ring-opening polymerization, cationic, anionic, radical, metathesis, and coordination polymerization are exemplified.

As the constituent material of the binder contained in the support portion forming composition 2A', for example, the same materials as described as the constituent material of the binder of the entity portion forming composition 2B' are exemplified. According to this, the same effect as described above is obtained.

The conditions such as form, size, and content ratio of the binder contained in the support portion forming composition 2A' are preferably, for example, the same conditions as described for the binder contained in the entity portion forming composition 2B'. According to this, the same effect as described above is obtained.

Incidentally, the binder contained in the support portion forming composition 2A' may satisfy the same conditions (for example, formulation, content ratio, etc.) as those for the binder contained in the entity portion forming composition 2B' or may satisfy different conditions.

Other Components

Further, the support portion forming composition 2A' may contain a component other than the above-mentioned components. As such a component, for example, a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, a pH adjusting agent, etc. are exemplified.

Three-Dimensional Shaped Article Producing Composition Set

Next, a three-dimensional shaped article producing composition set according to the invention will be described.

The three-dimensional shaped article producing composition set according to the invention includes a plurality of types of compositions used for producing a three-dimensional shaped article, and includes the three-dimensional shaped article producing composition of the invention as described above (a composition in which a plurality of particles, a solvent for dispersing the particles, and a binder are contained, a volume-based average particle diameter of the particles is 0.1 µm or more and less than 50 µm, and a content ratio of the binder is 1.5 vol % or more and 10 vol % or less) as at least one type of the compositions.

According to this, the three-dimensional shaped article producing composition set that can effectively prevent undesirable scattering of the particles 21 or the like in the production process for the three-dimensional shaped article 10, and that can be used for producing the three-dimensional shaped article 10 having excellent dimensional accuracy with high productivity can be provided.

The three-dimensional shaped article producing composition set may include at least one type of three-dimensional shaped article producing composition of the invention as described above, but preferably includes two or more types of three-dimensional shaped article producing compositions of the invention.

According to this, the dimensional accuracy and reliability of the three-dimensional shaped article 10 can be further improved.

Further, it is preferred that the three-dimensional shaped article producing composition set includes at least one type of entity portion forming composition 2B' used for forming the entity portion 4 of the three-dimensional shaped article 10 and also includes at least one type of support portion forming composition 2A' used for forming the support portion 5.

According to this, the dimensional accuracy and reliability of the three-dimensional shaped article 10 can be further improved.

Three-Dimensional Shaped Article Production Apparatus

Next, a three-dimensional shaped article production apparatus of the invention will be described.

Figure 12:
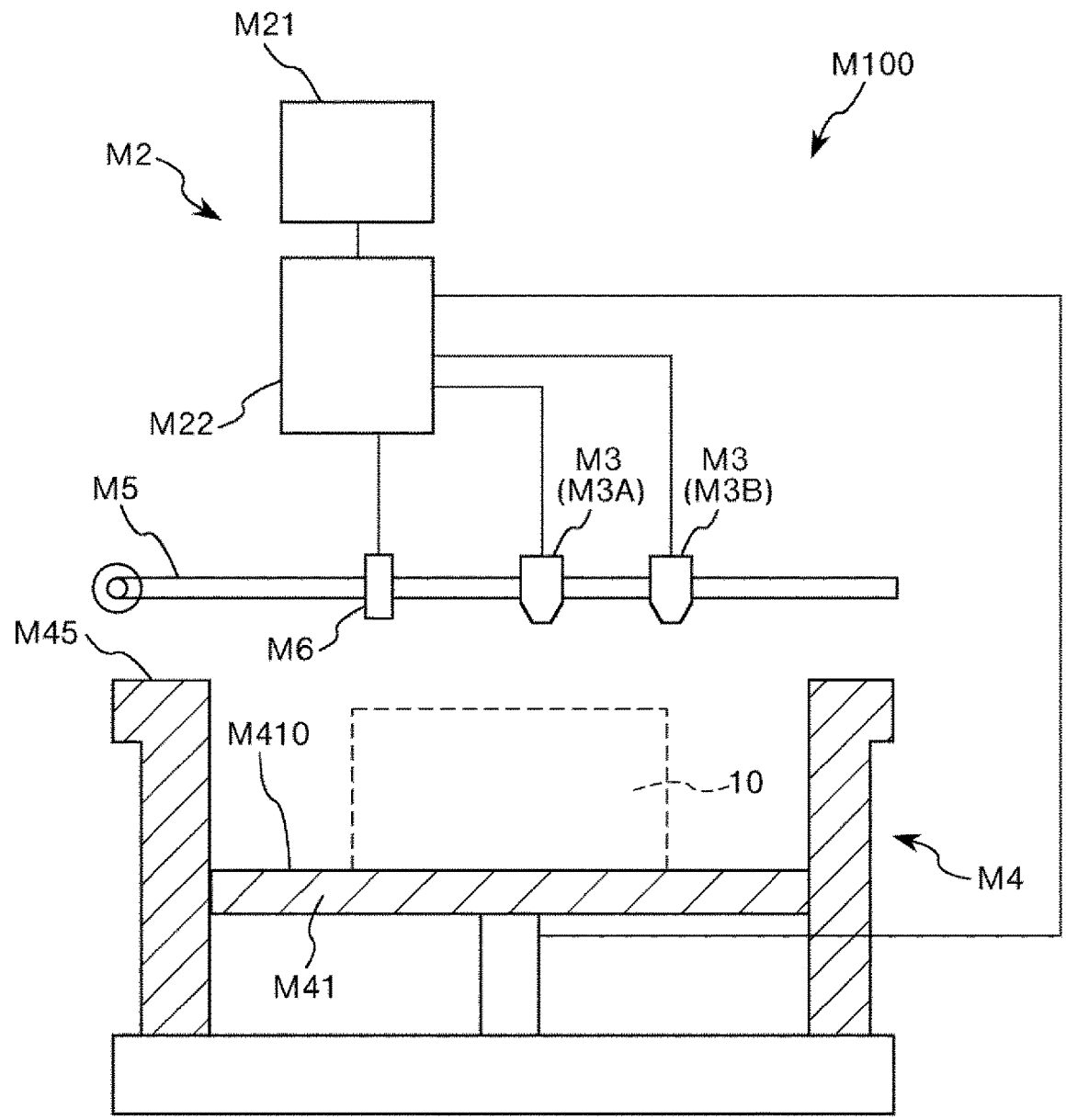
FIG. 12 is a side view schematically showing a preferred embodiment of a three-dimensional shaped article production apparatus of the invention.

FIG. 12 is a side view schematically showing a preferred embodiment of the three-dimensional shaped article production apparatus of the invention.

A three-dimensional shaped article production apparatus M100 includes a nozzle ejecting the three-dimensional shaped article producing composition of the invention, and a laser beam irradiation unit M6 that irradiates a layer 1 formed by ejecting the three-dimensional shaped article producing composition from the nozzle with a laser beam, and produces a three-dimensional shaped article 10 by stacking the layer 1.

More specifically, the three-dimensional shaped article production apparatus M100 includes a control unit M2, a composition supply unit (ejection unit) M3 including a nozzle ejecting a three-dimensional shaped article producing composition (composition) 2' containing particles 21 in a predetermined pattern, and the laser beam irradiation unit M6 that irradiates the composition 2' supplied in a predetermined pattern with a laser beam for joining the particles 21. Then, at least one of a composition 2A' and a composition 2B' (preferably at least the composition 2B', more preferably both of the composition 2A' and the composition 2B') is the three-dimensional shaped article producing composition of the invention (a composition in which a plurality of particles, a solvent for dispersing the particles, and a binder are contained, a volume-based average particle diameter of the particles is 0.1 µm or more and less than 50 µm, and a content ratio of the binder is 1.5 vol % or more and 10 vol % or less).

According to this, the production method of the invention as described above can be favorably performed, and undesirable scattering of the particles 21 or the like in the production process for the three-dimensional shaped article 10 can be prevented, and the three-dimensional shaped article 10 having excellent dimensional accuracy can be produced.

The control unit M2 includes a computer M21 and a drive control unit M22.

The computer M21 is a general desktop computer or the like configured to include a CPU, a memory, etc. therein. The computer M21 generates data as model data from the shape of the three-dimensional shaped article 10 and outputs sectional data (slice data) obtained by slicing the data into several parallel layers of thin sectional bodies to the drive control unit M22.

The drive control unit M22 included in the control unit M2 functions as a controlling unit that drives each of the composition supply unit (ejection unit) M3, a layer forming portion M4, the laser beam irradiation unit M6, and the like. Specifically, the drive control unit M22 controls, for example, driving (moving on an X-Y plane or the like) of the composition supply unit (ejection unit) M3, ejection of the composition 2' by the composition supply unit (ejection unit) M3, lowering of a stage (lifting stage) M41 movable in the Z direction in FIG. 12 and an amount of lowering of the stage, and an irradiation pattern, irradiation, a scanning speed, and the like of the laser beam by the laser beam irradiation unit M6.

To the composition supply unit (ejection unit) M3, a pipe from a material storage portion (material supply portion) (not shown) is coupled. In this material supply portion, the above-mentioned composition 2' is stored and ejected from the composition supply unit (ejection unit) M3 by the control of the drive control unit M22.

The composition supply unit (ejection unit) M3 can move along a guide M5 independently in each of the X direction and the Y direction in FIG. 12.

The layer forming portion M4 includes the stage (lifting stage) M41 that is supplied with the composition 2' and that supports the layer 1 formed using the composition 2', and a frame M45 surrounding the lifting stage M41.

The lifting stage M41 sequentially descends (moves toward the negative direction of the Z axis) by a predetermined amount according to a command from the drive control unit M22 when a new layer 1 is formed (stacked) on the previously formed layer 1.

An upper surface (in more detail, a portion to which the composition 2' is applied) of the stage M41 becomes a flat plane (liquid receiving face) M410. According to this, the layer 1 with high thickness uniformity can be easily and reliably formed.

The stage M41 is preferably constituted by a high-strength material. As the constituent material of the stage M41, for example, various metal materials such as a stainless steel, etc. are exemplified.

Further, the plane M410 of the stage M41 may be subjected to a surface treatment. According to this, for example, the constituent material of the composition 2' or the like is more effectively prevented from firmly adhering to the stage M41, or the durability of the stage M41 is improved, and thus, stable production of the three-dimensional shaped article 10 over a long period of time can be achieved. As the material used in the surface treatment of the plane M410 of the stage M41, for example, a fluorine-based resin such as polytetrafluoroethylene, etc. are exemplified.

The composition supply unit (ejection unit) M3 is configured to move according to the command from the drive control unit M22 and eject the composition 2' at a desired site on the stage M41 in a predetermined pattern.

The composition supply unit (ejection unit) M3 is configured to eject the composition 2'.

As the composition supply unit (ejection unit) M3, for example, an inkjet head, various dispensers, etc. are exemplified, but it is preferably a dispenser.

According to this, even the composition 2' having a high viscosity can be favorably supplied (ejected), and dripping or the like of the composition 2' after the composition 2' comes in contact with a target site can be more effectively prevented. As a result, the dimensional accuracy of the three-dimensional shaped article 10 to be finally obtained can be further improved. In addition, by using the composition 2' having a high viscosity, the layer 1 having a relatively large thickness can be easily formed, and the productivity of the three-dimensional shaped article 10 can be further improved.

The size (nozzle diameter) of the ejection portion of the composition supply unit (ejection unit) M3 is not particularly limited, but is preferably 10 µm or more and 100 µm or less.

According to this, the productivity of the three-dimensional shaped article 10 can be further improved while further improving the dimensional accuracy of the three-dimensional shaped article 10.

The composition supply unit (ejection unit) M3 preferably ejects the composition 2' as a liquid droplet. According to this, the composition 2' can be applied in a fine pattern, and even the three-dimensional shaped article 10 having a fine structure can be produced with particularly high dimensional accuracy and particularly high productivity.

The three-dimensional shaped article production apparatus M100 includes a plurality of composition supply units (ejection units) M3.

According to this, a plurality of types of compositions 2' can be used in combination. More specifically, for example, a plurality of types of entity portion forming compositions can be used or the entity portion forming composition and the support material forming composition can be used in combination.

Particularly, in the configuration shown in the drawing, as two composition supply units (ejection units) M3, a first composition supply unit (first ejection unit) M3A and a second composition supply unit (second ejection unit) M3B are included.

According to this, for example, two types of entity portion forming compositions can be used, or one type of entity portion forming composition and one type of support material forming composition can be used in combination, and so on.

Further, by adopting a configuration in which the composition 2' of the same type is supplied from different composition supply units (ejection units) M3, the productivity of the three-dimensional shaped article 10 can be further improved.

In the following description, a case where one type of entity portion forming composition and one type of support material forming composition are used in combination will be mainly described.

The laser beam irradiation unit M6 has a function to irradiate (scan) the composition 2' with a laser beam for joining the particles 21 contained in the composition 2' after the composition 2' comes in contact with a target site.

According to this, the particles 21 contained in the composition 2' are joined and a joined portion 3 can be formed. Particularly, by scanning the pattern of the composition 2' containing the particles 21 with a laser beam, energy can be selectively applied to the composition 2', and the energy efficiency for formation of the joined portion 3 can be further improved. According to this, joining of the particles 21 or the removal of the binder or the like can be more efficiently performed, and the productivity of the three-dimensional shaped article 10 can be further improved. In addition, the energy efficiency can be improved, and therefore, it is also advantageous in terms of saving energy.

In the invention, the production of the three-dimensional shaped article 10 may be performed in a chamber in which the formulation of an atmosphere or the like is controlled. According to this, for example, the joining step can be performed in an inert gas, and undesirable degeneration or the like of the particles can be more effectively prevented. Further, for example, by performing the joining step in an atmosphere containing a reactive gas, the three-dimensional shaped article 10 constituted by a material having a different formulation from the formulation of the particles used as a raw material can be favorably produced.

Three-Dimensional Shaped Article

The three-dimensional shaped article according to the invention can be produced using the three-dimensional shaped article production apparatus of the invention as described above.

According to this, undesirable scattering of particles or the like in the production process for the three-dimensional shaped article can be effectively prevented, and the three-dimensional shaped article having excellent dimensional accuracy and reliability can be produced with high productivity.

The use of the three-dimensional shaped article is not particularly limited, however, for example, an appreciation article and an exhibit such as a doll and a figure; a medical device such as an implant; etc. are exemplified.

In addition, the three-dimensional shaped article may be applied to any of a prototype, a mass-produced product, and a custom-made product.

Hereinabove, preferred embodiments of the invention are described, however, the invention is not limited thereto.

For example, in the three-dimensional shaped article production apparatus of the invention, the configuration of each portion can be replaced with an arbitrary configuration exhibiting a similar function, and further, an arbitrary configuration can also be added.

For example, the three-dimensional shaped article production apparatus of the invention may include a heating unit that heats a composition to be ejected. According to this, the viscosity of the composition is decreased, and the ejectability can be further improved. In addition, by heating the composition in advance before being ejected, the composition after being ejected is cooled to increase the viscosity of the composition after being ejected, and the stability of the shape of the pattern formed by the composition can be further improved. According to this, the productivity and the dimensional accuracy of the three-dimensional shaped article can be made compatible at a higher level.

Further, the three-dimensional shaped article production apparatus of the invention may include a cooling unit (not shown). According to this, for example, the layer after the particles are joined can be rapidly cooled, and the later step can be favorably performed. As a result, the productivity, dimensional accuracy, reliability, and the like of the three-dimensional shaped article can be further improved. In addition, the apparatus may include an infrared halogen lamp, a carbon heater, or the like as a solvent removing unit.

Further, in the above-mentioned embodiments, a case where a layer is directly formed in the surface of the stage is representatively described, however, for example, a shaping plate is placed on the stage, and a three-dimensional shaped article may be produced by staking layers on the shaping plate. In such a case, in the production process for the three-dimensional shaped article, the shaping plate and the particles constituting the lowermost layer are joined, and thereafter, the shaping plate may be removed from the target three-dimensional shaped article in a post-treatment. According to this, for example, the occurrence of warpage of the layer in the process for stacking a plurality of layers can be more effectively prevented, and the dimensional accuracy of the three-dimensional shaped article to be finally obtained can be further improved.

Further, in the above-mentioned embodiments, a case where with respect to a single layer, the second pattern forming step is performed after the first pattern forming step is mainly described, however, in the formation of at least one layer, the order of the first pattern forming step and the second pattern forming step may be reversed. Further, a plurality of types of compositions may be simultaneously applied in different regions.

Further, in the above-mentioned embodiments, a case where with respect to a single layer, the solvent removing step is performed after performing the first pattern forming step and the second pattern forming step is representatively described, however, for example, the solvent removing step may be individually performed each time after the first pattern forming step and after the second pattern forming step.

Further, in the above-mentioned embodiments, a case where in the formation of all layers, the first pattern and the second pattern are formed is representatively described, however, a stacked body formed by stacking a plurality of layers may include, for example, a layer that does not have the first pattern or a layer that does not have the second pattern. Further, a layer in which a portion corresponding to the entity portion is not formed (for example, a layer constituted by only the support portion) is formed in a contact face with the stage (right above the stage) and the layer may be made to function as a sacrificial layer.

Further, in the production method for a three-dimensional shaped article of the invention, the order of the steps or treatments is not limited to the order described above, and the steps or treatments may be performed by changing the order of at least some of them.

For example, the order of the first joining step and the second joining step may be changed, or the first joining step and the second joining step may be concurrently performed at different sites in the layer.

Further, in the above-mentioned embodiments, a case where in the joining step, the joining of the particles contained in the support portion forming composition is not performed together with the joining of the particles contained in the entity portion forming composition is mainly described, however, in the joining step, the joining of the particles contained in the support portion forming composition may be performed together with the joining of the particles contained in the entity portion forming composition.

Further, the support portion may not be formed depending on the shape of the three-dimensional shaped article to be produced.

Further, in the above-mentioned embodiments, a case where a layer having a desired shape is formed by ejecting the three-dimensional shaped article producing composition in a predetermined pattern is representatively described, however, the invention may be applied to a method in which a layer is formed by flattening the three-dimensional shaped article producing composition using a flattening unit such as a squeezee or a roller, and a joined portion is formed by irradiating the layer with a laser beam, or the like (an SLS method or the like).

Further, in the production method of the invention, a pre-treatment step, an intermediate-treatment step, or a post-treatment step may be performed as needed.

As the pre-treatment step, for example, a stage cleaning step, etc. are exemplified.

As the post-treatment step, for example, a washing step, a shape adjusting step in which deburring or the like is performed, a coloring step, a coating layer forming step, a heat treatment step for improving the joining strength between particles, etc. are exemplified.

Further, the production method for a three-dimensional shaped article of the invention is not limited to the method performed by using the three-dimensional shaped article production apparatus as described above.

EXAMPLES

Hereinafter, the invention will be described in more detail with reference to specific examples, however, the invention is not limited only to these examples. Incidentally, in the following description, a treatment for which a temperature condition is not particularly shown was performed at room temperature (25° C.). Further, also with respect to various measurement conditions, when a temperature condition is not particularly shown, a value is obtained at room temperature (25° C.)

Example 1

1. Production of Three-Dimensional Shaped Article Producing Composition

An SUS 316L powder having an average particle diameter of 3.0 μm: 100 parts by mass, glycerin as a solvent: 28.33 parts by mass, nanocellulose constituted by cellulose: 0.071 parts by mass, and polyvinyl alcohol: 0.9 parts by mass were mixed, whereby an entity portion forming composition as a three-dimensional shaped article producing composition was obtained (see Table 1). In the thus obtained entity portion forming composition, the nanocellulose covered the surfaces of the constituent particles of the SUS 316L powder.

Further, an alumina powder having an average particle diameter of 3.0 μm: 100 parts by mass, glycerin as a solvent:

28.33 parts by mass, nanocellulose constituted by cellulose: 0.071 parts by mass, and polyvinyl alcohol: 1.2 parts by mass were mixed, whereby a support portion forming composition as a three-dimensional shaped article producing composition was obtained (see Table 2). In the thus obtained support portion forming composition, the nanocellulose covered the surfaces of the constituent particles of the alumina powder.

By doing this, a three-dimensional shaped article producing composition set composed of the entity portion forming composition and the support portion forming composition was obtained.

2. Production of Three-Dimensional Shaped Article

By using the three-dimensional shaped article producing compositions obtained as described above, a three-dimensional shaped article in a rectangular parallelepiped shape having a designed dimension of 4 mm in thickness, 10 mm in width, and 80 mm in length was produced as follows.

First, a three-dimensional shaped article production apparatus as shown in FIG. 12 was prepared, and the support portion forming composition was ejected as a plurality of liquid droplets in a predetermined pattern on a stage from a nozzle of a dispenser as the first composition supply unit, whereby a first pattern (support portion pattern) was formed (layer forming step (first pattern forming step)).

Subsequently, the entity portion forming composition was ejected as a plurality of liquid droplets in a predetermined pattern on the stage from a nozzle of a dispenser as the second composition supply unit, whereby a second pattern (entity portion pattern) was formed (layer forming step (second pattern forming step)).

By doing this, a layer composed of the first pattern and the second pattern was formed. The thickness of the layer was 50 μm.

Thereafter, the layer composed of the first pattern and the second pattern was subjected to a heating treatment at 250° C., whereby the solvent contained in the layer was removed (solvent removing step).

Thereafter, the first pattern and the second pattern of the layer were sequentially scanned (irradiated) with a laser beam (YAG laser, the maximum peak wavelength: 1,064 nm), whereby joining of the particles was performed. By doing this, a first joined portion (support portion) and a second joined portion (entity portion) were formed (joining step).

By repeatedly performing a series of steps including the steps from the layer forming step (the first pattern forming step and the second pattern forming step) to the joining step as described above, a stacked body having a shape corresponding to the three-dimensional shaped article to be produced was obtained.

Thereafter, the support portion was smashed, and the target three-dimensional shaped article was taken out.

Examples 2 to 9

Three-dimensional shaped article producing compositions (three-dimensional shaped article producing composition sets) and three-dimensional shaped articles were produced in the same manner as in the above-mentioned Example 1 except that the formulations of the entity portion forming composition and the support portion forming composition were changed as shown in Table 1 and Table 2, respectively.

Example 10

A three-dimensional shaped article producing composition and a three-dimensional shaped article were produced in the same manner as in the above-mentioned Example 1 except that only the entity portion forming composition was used as the three-dimensional shaped article producing composition, and the support portion forming composition was not used (the first pattern forming step was omitted).

Comparative Example 1

Three-dimensional shaped article producing compositions (a three-dimensional shaped article producing composition set) and a three-dimensional shaped article were produced in the same manner as in the above-mentioned Example 6 except that particles having an average particle diameter of 0.04 μm were used as the particles contained in the entity portion forming composition and the support portion forming composition.

Comparative Example 2

Three-dimensional shaped article producing compositions (a three-dimensional shaped article producing composition set) and a three-dimensional shaped article were produced in the same manner as in the above-mentioned Example 6 except that particles having an average particle diameter of 52 μm were used as the particles contained in the entity portion forming composition and the support portion forming composition.

Comparative Example 3

Three-dimensional shaped article producing compositions (a three-dimensional shaped article producing composition set) and a three-dimensional shaped article were produced in the same manner as in the above-mentioned Example 6 except that the entity portion forming composition and the support portion forming composition were used such that the content ratio of the binder therein was set to 1.18 vol %.

Comparative Example 4

Three-dimensional shaped article producing compositions (a three-dimensional shaped article producing composition set) and a three-dimensional shaped article were produced in the same manner as in the above-mentioned Example 6 except that the entity portion forming composition and the support portion forming composition were used such that the content ratio of the binder therein was set to 11.95 vol %.

The formulations of the three-dimensional shaped article producing compositions (three-dimensional shaped article producing composition sets) of the above-mentioned respective Examples and Comparative Examples are summarized and shown in Tables 1 and 2. Incidentally, in the tables, glycerin is denoted by "Gly", propylene glycol is denoted by "PG", diethylene glycol monobutyl ether acetate is denoted by "BCA", diethylene glycol diethyl ether is denoted by "DEDG", nanocellulose is denoted by "NC", polyvinyl alcohol is denoted by "PVA", and an acrylic resin is denoted by "Ac".

Further, the values of the viscosity of the support portion forming compositions and the entity portion forming compositions used in the above-mentioned respective Examples were all within a range of 1,000 mPa·s or more and 20,000 mPa·s or less. Further, the values of the volume per liquid droplet of the support portion forming compositions and the entity portion forming compositions in the above-mentioned respective Examples and Comparative Examples were all within a range of 1 nL or more and 50 nL or less. Further, in the above-mentioned respective Examples and Comparative Examples, the values of the content ratio of the solvent in the layer after the solvent removing step were all within a range of 0.5 mass % or more and 20 mass % or less. Further, in the support portion forming compositions and the entity portion forming compositions used in the above-mentioned respective Examples, the values of the width and the thickness of the nanocellulose were all within a range of 10 nm or more and 50 nm or less, and the values of the length of the nanocellulose were all within a range of 150 nm or more and 400 nm or less, and the values of the aspect ratio of the fiber of the nanocellulose were all within a range of 7 or more and 30 or less. Further, in all the support portion forming compositions and the entity portion forming compositions used in the above-mentioned respective Examples, the nanocellulose covered the surfaces of the particles, and the values of the coverage of the surfaces of the particles with the nanocellulose were all within a range of 80% or more and 100% or less.

TABLE 1

| | Entity portion forming composition | | | | | | | | |
|---|---|---|---|---|---|---|---|---|---|
| | Particles | | | Solvent | | | Binder | | |
| | Constituent material | Average particle diameter [μm] | Content [parts by mass] | Content ratio [vol %] | Constituent material | Content [parts by mass] | Content ratio [vol %] | Constituent material | Content [parts by mass] | Content ratio [vol %] |
| Example 1 | SUS316L | 3.0 | 100 | 34.99 | Gly | 28.33 | 62.78 | NC/PVA | 0.071/0.9 | 0.13/2.09 |
| Example 2 | SUS316L | 0.1 | 100 | 35.23 | Gly | 28.33 | 63.22 | NC/PVA | 0.20/0.50 | 0.37/1.17 |
| Example 3 | SUS316L | 50 | 100 | 33.91 | Gly | 28.33 | 60.84 | NC/PVA | 0.04/2.3 | 0.07/5.19 |
| Example 4 | SUS316L | 0.3 | 100 | 35.15 | Gly | 28.33 | 63.08 | NC/PVA | 0.071/0.7 | 0.13/1.64 |
| Example 5 | SUS316L | 10 | 100 | 34.91 | Gly | 28.33 | 62.64 | NC/PVA | 0.071/1.0 | 0.13/2.32 |
| Example 6 | SUS316L | 10 | 100 | 32.26 | Gly | 28.33 | 57.88 | PVA | 4.6 | 9.87 |
| Example 7 | SUS316L | 10 | 100 | 29.62 | BCA | 28.33 | 68.32 | NC/Ac | 0.06/1.0 | 0.09/1.97 |
| Example 8 | SUS316L | 0.3 | 100 | 28.08 | DEDG | 28.33 | 69.75 | NC/Ac | 0.08/1.1 | 0.12/2.05 |
| Example 9 | SUS316L | 3.0 | 100 | 30.89 | PG | 28.33 | 67.15 | NC/PVA | 0.07/0.9 | 0.12/1.85 |
| Example 10 | SUS316L | 3.0 | 100 | 34.99 | Gly | 28.33 | 62.78 | NC/PVA | 0.071/0.9 | 0.13/2.09 |
| Comparative Example 1 | SUS316L | 0.04 | 100 | 32.26 | Gly | 28.33 | 57.88 | PVA | 4.6 | 9.87 |
| Comparative Example 2 | SUS316L | 52 | 100 | 32.26 | Gly | 28.33 | 57.88 | PVA | 4.6 | 9.87 |
| Comparative Example 3 | SUS316L | 10 | 100 | 35.37 | Gly | 28.33 | 63.46 | PVA | 0.5 | 1.18 |
| Comparative Example 4 | SUS316L | 10 | 100 | 31.51 | Gly | 28.33 | 56.54 | PVA | 5.7 | 11.95 |

TABLE 2

| | Support portion forming composition | | | | | | | | |
|---|---|---|---|---|---|---|---|---|---|
| | Particles | | | Solvent | | | Binder | | |
| | Constituent material | Average particle diameter [μm] | Content [parts by mass] | Content ratio [vol %] | Constituent material | Content [parts by mass] | Content ratio [vol %] | Constituent material | Content [parts by mass] | Content ratio [vol %] |
| Example 1 | Alumina | 3.0 | 100 | 52.15 | Gly | 28.33 | 45.73 | NC/PVA | 0.071/1.2 | 0.10/2.03 |
| Example 2 | Alumina | 0.1 | 100 | 52.41 | Gly | 28.33 | 45.96 | NC/PVA | 0.20/0.8 | 0.27/1.36 |
| Example 3 | Alumina | 50 | 100 | 50.54 | Gly | 28.33 | 44.32 | NC/PVA | 0.04/3.1 | 0.05/5.09 |
| Example 4 | Alumina | 0.3 | 100 | 52.32 | Gly | 28.33 | 45.88 | NC/PVA | 0.071/1.0 | 0.10/1.70 |
| Example 5 | Alumina | 10 | 100 | 51.97 | Gly | 28.33 | 45.57 | NC/PVA | 0.071/1.4 | 0.10/2.36 |
| Example 6 | Alumina | 10 | 100 | 48.04 | Gly | 28.33 | 42.12 | PVA | 6.3 | 9.84 |
| Example 7 | Alumina | 10 | 100 | 46.06 | BCA | 28.33 | 51.93 | NC/Ac | 0.06/1.3 | 0.07/1.95 |
| Example 8 | Alumina | 0.3 | 100 | 44.21 | DEDG | 28.33 | 53.68 | NC/Ac | 0.08/1.4 | 0.09/2.01 |
| Example 9 | Alumina | 3.0 | 100 | 47.55 | PG | 28.33 | 50.51 | NC/PVA | 0.07/1.2 | 0.09/1.85 |
| Example 10 | — | — | — | — | — | — | — | — | — | — |
| Comparative Example 1 | Alumina | 0.04 | 100 | 48.04 | Gly | 28.33 | 42.12 | PVA | 6.3 | 9.84 |
| Comparative Example 2 | Alumina | 52 | 100 | 48.04 | Gly | 28.33 | 42.12 | PVA | 6.3 | 9.84 |
| Comparative Example 3 | Alumina | 10 | 100 | 52.64 | Gly | 28.33 | 46.16 | PVA | 0.7 | 1.20 |
| Comparative Example 4 | Alumina | 10 | 100 | 46.87 | Gly | 28.33 | 41.10 | PVA | 7.9 | 12.03 |

3. Evaluation

3.1 Surface Shape of Layer after Joining Step

With respect to each of the above-mentioned respective Examples and Comparative Examples, by using each of the three-dimensional shaped article producing compositions (the entity portion forming composition and the support portion forming composition), a single layer having the first pattern and the second pattern subjected to the joining treatment was formed in the same manner as described above.

Thereafter, the arithmetic average height Sa of the surface of the layer and the maximum height Sz of the surface were determined by measurement according to ISO 25178 and evaluated according to the following criteria.

Arithmetic Average Height Sa

A: The arithmetic average height Sa is less than 10 μm.
B: The arithmetic average height Sa is 10 μm or more and less than 15 μm.
C: The arithmetic average height Sa is 15 μm or more and less than 20 μm.
D: The arithmetic average height Sa is 20 μm or more and less than 25 μm.
E: The arithmetic average height Sa is 25 μm or more.

Maximum Height Sz

A: The maximum height Sz is less than 90 μm.
B: The maximum height Sz is 90 μm or more and less than 250 μm.
C: The maximum height Sz is 250 μm or more and less than 400 μm.
D: The maximum height Sz is 400 μm or more and less than 500 μm.
E: The maximum height Sz is 500 μm or more.

3.2 Dimensional Accuracy of Three-Dimensional Shaped Article

With respect to each of the three-dimensional shaped articles of the above-mentioned respective Examples and Comparative Examples, the thickness, width, and length were measured, and the amounts of deviation from the design values were determined and evaluated according to the following criteria.

A: The largest amount of deviation from the design value among the amounts of deviation from the design values of the thickness, width, and length is less than 1.0%.
B: The largest amount of deviation from the design value among the amounts of deviation from the design values of the thickness, width, and length is 1.0% or more and less than 2.0%.
C: The largest amount of deviation from the design value among the amounts of deviation from the design values of the thickness, width, and length is 2.0% or more and less than 4.0%.
D: The largest amount of deviation from the design value among the amounts of deviation from the design values of the thickness, width, and length is 4.0% or more and less than 7.0%.
E: The largest amount of deviation from the design value among the amounts of deviation from the design values of the thickness, width, and length is 7.0% or more.

3.3 Content Ratio of Carbon in Three-Dimensional Shaped Article

With respect to each of the three-dimensional shaped articles of the above-mentioned respective Examples and Comparative Examples, the content ratio of carbon was determined by measurement according to JIS G 1211-3:2011 and evaluated according to the following criteria.

A: The content ratio of carbon is less than 0.03 mass %.
B: The content ratio of carbon is 0.03 mass % or more and less than 0.05 mass %.
C: The content ratio of carbon is 0.05 mass % or more and less than 0.10 mass %.
D: The content ratio of carbon is 0.10 mass % or more and less than 0.20 mass %.
E: The content ratio of carbon is 0.20 mass % or more.

These results are summarized and shown in Table 3.

TABLE 3

| | Surface shape of layer after joining step | | Dimensional accuracy of three-dimensional shaped article | Content ratio of carbon in three-dimensional shaped article |
|---|---|---|---|---|
| | Arithmetic average height Sa | Maximum height Sz | | |
| Example 1 | A | A | A | B |
| Example 2 | B | B | B | A |
| Example 3 | A | A | A | B |
| Example 4 | B | B | B | A |
| Example 5 | A | A | A | B |
| Example 6 | A | A | B | C |
| Example 7 | A | A | A | A |
| Example 8 | A | A | A | A |
| Example 9 | A | A | A | A |
| Example 10 | A | A | A | B |
| Comparative Example 1 | C | C | C | C |
| Comparative Example 2 | D | D | D | C |

TABLE 3-continued

| | Surface shape of layer after joining step | | Dimensional accuracy of three-dimensional shaped article | Content ratio of carbon in three-dimensional shaped article |
|---|---|---|---|---|
| | Arithmetic average height Sa | Maximum height Sz | | |
| Comparative Example 3 | E | E | E | A |
| Comparative Example 4 | A | A | C | D |

As apparent from Table 3, according to the invention, a three-dimensional shaped article having high dimensional accuracy and reliably could be produced. Further, according to the invention, an undesirable increase in carbon content ratio in the three-dimensional shaped article was effectively prevented. On the other hand, in Comparative Examples, satisfactory results could not be obtained.

The entire disclosure of Japanese Patent Application No. 2017-037764 filed on Feb. 28, 2017 is expressly incorporated by reference herein.

The invention claimed is:

1. A three-dimensional shaped article producing composition for producing a three-dimensional shaped article, the composition comprising:
   a plurality of metal particles;
   a solvent dispersing the metal particles; and
   a binder temporarily binding the metal particles to one another in a state where the solvent is removed,
   wherein the binder includes nanocellulose,
   a volume-based average particle diameter of the metal particles is 0.1 μm or more and less than 50 μm,
   a content ratio of the binder is 1.5 vol % or more and 10 vol % or less,
   20% to 100% of a surface of the metal particles is covered by the nanocellulose,
   the composition is configured to be ejected as a plurality of liquid droplets, and a volume per liquid droplet to be ejected is 1 pL or more and 100,000 pL or less, and
   a viscosity of the composition is 100 mPa·s or more and 1,000,000 mPa·s or less.

2. The three-dimensional shaped article producing composition according to claim 1, wherein the metal particles are constituted by SUS 316L.

3. The three-dimensional shaped article producing composition according to claim 2, wherein a content ratio of the binder is 1.5 vol % or more and 2.1 vol % or less.

4. The three-dimensional shaped article producing composition according to claim 2, wherein the volume-based average particle diameter of the particles is 0.1 μm or more and 10 μm or less.

5. The three-dimensional shaped article producing composition according to claim 1, wherein the binder contains at least one of polyvinyl alcohol and an acrylic resin.

6. The three-dimensional shaped article producing composition according to claim 5, wherein
   the binder contains polyvinyl alcohol, and
   the solvent contains propylene glycol.

7. The three-dimensional shaped article producing composition according to claim 5, wherein
   the binder contains an acrylic resin, and
   the solvent contains an ether.

8. The three-dimensional shaped article producing composition according to claim 1, wherein a content ratio of the nanocellulose is 0.02 vol % or more and 0.42 vol % or less.

* * * * *